(12) United States Patent
Rathi et al.

(10) Patent No.: US 12,328,456 B2
(45) Date of Patent: Jun. 10, 2025

(54) DYNAMIC ASSIGNMENT OF DATA STREAM PROCESSING IN MULTI-CODEC SYSTEMS

(71) Applicant: NVIDIA Corporation, Santa Clara, CA (US)

(72) Inventors: Swapnil Jagdish Rathi, Pune (IN); Viranjan Vishwasrao Pagar, Pune (IN); Bhushan Rupde, Pune (IN); Kaustubh Purandare, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 125 days.

(21) Appl. No.: 18/100,386

(22) Filed: Jan. 23, 2023

(65) Prior Publication Data

US 2024/0251114 A1    Jul. 25, 2024

(51) Int. Cl.
H04N 21/234    (2011.01)
H04N 21/258    (2011.01)

(52) U.S. Cl.
CPC . *H04N 21/23418* (2013.01); *H04N 21/25833* (2013.01)

(58) Field of Classification Search
CPC ................... H04N 21/23418; H04N 21/25833
See application file for complete search history.

(56) References Cited

U.S. PATENT DOCUMENTS

2007/0201562 A1* 8/2007 Ganesh .................. H04N 19/42
375/240.26
2021/0021878 A1* 1/2021 Fryer ................. H04N 21/2343

* cited by examiner

*Primary Examiner* — Nicholas T Corbo
(74) *Attorney, Agent, or Firm* — Lowenstein Sandler LLP

(57) ABSTRACT

Systems and methods for improved media stream processing. In at least one embodiment, a media stream is assigned to either a hardware processing engine or software processing engine based on a performance state of an application server and one or more parameters of the media stream.

20 Claims, 11 Drawing Sheets

DYNAMIC ASSIGNMENT OF DATA STREAM PROCESSING IN MULTI-CODEC SYSTEMS

TECHNICAL FIELD

Embodiments of the disclosure generally relate to data stream processing, and more specifically, to improved techniques for processing media data streams.

BACKGROUND

A number of applications involve processing large numbers of media data streams (or media streams), for example, using a media server (or similar computing system or device). Some media servers include specialized hardware for encoding/decoding these media streams, but such hardware can become overloaded given the number of media streams that a media server must handle, which may result in an undesirable reduction in media stream quality.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
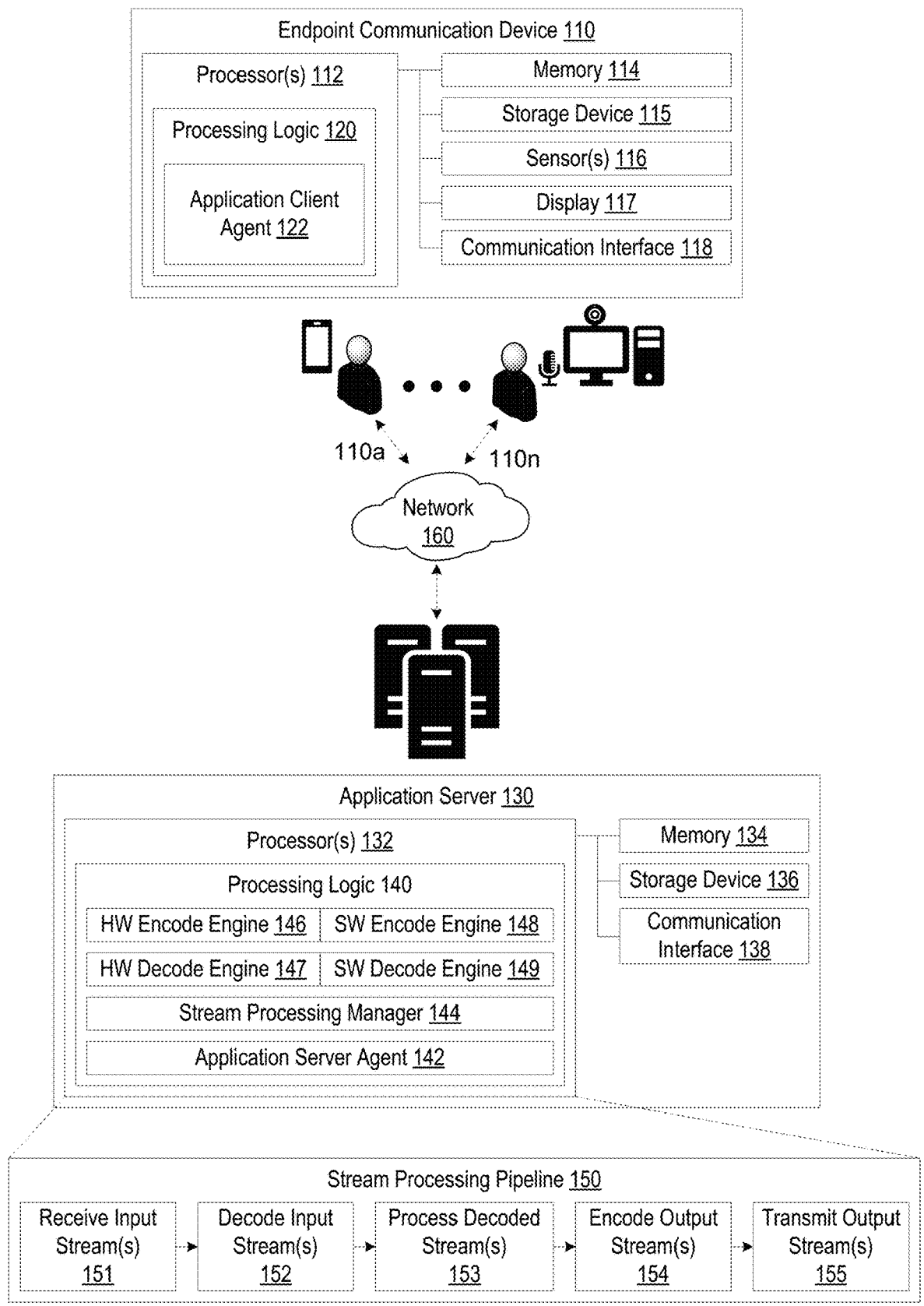
FIG. 1 illustrates an example computing environment, according to at least one embodiment.

A number of applications involve processing large numbers of media data streams (or media streams), for example, by a media server (or similar computing system or device). Computer visions systems, for example, may utilize a media server to process media streams from cameras and other sensors (e.g., to identify and track objects or provide other intelligent video analytics) in support of a wide variety of practical applications (e.g., in the safety, retail, industrial, robotics, and medical fields). As another example, a media server may be used to facilitate multimedia conferencing (e.g., video conferencing) and streaming applications. For instance, in facilitating a multimedia conference, a media server may be used to process a number of media streams, including for example, decoding one or more media streams received from each conference participant and encoding one or more media streams for transmission to each conference participant. Multimedia conferences frequently involve a large number of participants, each of whom may transmit and receive a number of multimedia streams. A media server, moreover, may host multiple multimedia conferences simultaneously (e.g., hosting communications of an entire organization), further increasing the number of media streams that need to be processed. While some media servers may include specialized hardware for encoding/decoding media streams, such hardware can become overloaded given the sheer number of media streams that a media server handles, which may result in a reduction in media stream quality (e.g., dropped frames, reduced bitrate and/or resolution, etc.).

Embodiments of the present disclosure address such issues by leveraging software encoding/decoding capabilities of a media server (or similar computing system or device), in addition to hardware enabled capabilities, to increase a number of media streams capable of being processed by the media server (e.g., a media stream processing density) without affecting media stream quality. In some embodiments, the media server may include a dynamic switching layer, sitting between an application and the software and hardware encoding/decoding capabilities of the media server, that may dynamically configure (or assign) the processing of media streams between software and hardware to achieve optimal throughput and quality. The assignment of media streams to software and/or hardware may be performed periodically and/or in response to certain events (e.g., the addition or removal of a media stream, changes to parameters of an existing media stream, etc.), with the determination of how media streams are to be assigned being based on an assessment of a performance state of the media server (e.g., resource utilization levels, etc.), performance capabilities of the media server, media stream parameters, and/or additional application parameters.

By utilizing both the software and hardware encoding/decoding capabilities of a media server, the media stream processing density of the media server may be increased without affecting media quality (e.g., relative to a hardware reliant media server). Furthermore, because the switching layer may act as a layer between an application and the software and hardware encoding/decoding capabilities of a media server, the determination of an optimal processing configuration and the dynamic reassignment of processing of media streams therebetween may be transparent to the application. Thus, when developing an application, consideration need not be given to how to optimize media stream processing—an otherwise laborious undertaking requiring detailed knowledge of the hardware components of the media server on which it may run (something that is rarely known at the time of development)—and application developers may rely on the switching layer to provide such optimization instead.

The systems, methods, and techniques described herein may be used by, without limitation, non-autonomous vehicles, semi-autonomous vehicles (e.g., in one or more adaptive driver assistance systems (ADAS) or in-vehicle infotainment (IVI) systems), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems, methods, and techniques described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an IVI system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

FIG. 1 illustrates an example computing environment in which one or more application sessions may be conducted, according to at least one embodiment. As illustrated, computing environment 100 may include an application server 130 and one or more endpoint communication devices, or endpoints 110, that may communicate with one another via network 160. In some embodiments, for example, application server 130 may host an application service that endpoints 110 may communicate with (e.g., using a client application) to conduct an application session, which may involve receiving and processing one or more input media streams (and in some cases, transmitting one or more output media streams). In some embodiments, for instance, application server 130 may host an artificial intelligence (AI) enabled computer vision platform (or vision AI platform) that may process media streams received from endpoints 110 (e.g., captured by cameras and/or other sensor(s) 116) in support of a wide variety of practical applications (e.g., to create a frictionless retail experience, streamline inventory management, facilitate traffic engineering in smart cities, perform optical inspection on factory floors, improve patient care in healthcare facilities, and/or other practical applications). The vision AI platform, for example, may process the received video streams through one or more AI/machine learning models, for example, to perform image classification (e.g., using an EfficientNet or ResNet model), object detection (e.g., using a RetinaNet or YOLOV3/V4 model) and segmentation (e.g., using a UNET MaskRCNN model), and/or other computer vision tasks (e.g., people detection, vehicle classification, automatic license plate recognition, 2D\3D pose estimation, automatic speech recognition, etc.). As another example, in some embodiments, application server 130 may host a conferencing platform (e.g., an internet protocol (IP) telephony or video conferencing platform) that may facilitate a media or multimedia communication session (e.g., an IP telephony call, video conference, etc.) by receiving and processing input media streams from endpoints 110 and transmitting output media streams to endpoints 110. In some embodiments, the conferencing platform may employ AI techniques to enhance the communication session, for example, to provide enhanced audio (e.g., improved audio resolution, echo cancellation, noise removal, speaker focus, etc.), enhanced video (e.g., improved video resolution, detail enhancement, artifact reduction, video noise removal, virtual background (or AI green screen), etc.), augmented reality effects (e.g., face tracking, facial expression estimation, body pose estimation, eye contact simulation, avatar simulation, etc.), and/or other enhancements (e.g., real-time translation, speech-to-text\text-to-speech conversion, etc.). It will be appreciated that such applications are merely illustrative and that while description may be provided with reference to such example applications, the present disclosure is not thus limited.

Application server 130 can take a variety of forms depending on the embodiment and its application, including for example, a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or other computing device. It will be appreciated that, in some embodiments, application server 130 may be a virtualized instance of a computer server, with the underlying hardware resources being provided by pools of shared computing resources (e.g., shared processor pools, shared memory pools, etc.) that may be dynamically allocated and accessed as needed.

In some embodiments, application server 130 may include one or more processor(s) 132 that may be coupled to and communicate with one or more memor(ies) 134, storage device(s) 136, and/or communication interface(s) 138. In some embodiments, processor(s) 132 may include one or more cores, one or more caches, a memory controller (e.g., NVDIMM controller), and a storage protocol controller (e.g., PCIe controller, SATA controller). In some embodiments, processor(s) 132 may be coupled to and communicate with memor(ies) 134, storage device(s) 136, and/or communication interface(s) 138 via a physical host interface, including for example, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface may provide an interface over which control, address, data, and other signals may be communicated between processor(s) 132 and memor(ies) 134, storage device(s) 136, and/or communication interface(s) 138. In some embodiments, processor(s) 132 may utilize an NVM Express (NVMe) interface to access components (e.g., storage device(s) 136) coupled with the processor(s) 132 by the physical host interface (e.g., PCIe bus).

In some embodiments, processor(s) 132 may be coupled to and communicate with memor(ies) 134, storage device(s)

136, and/or communication interface(s) 138 via a network host interface or other logical host interface. In some embodiments, for example, memor(ies) 134, storage device (s) 136, and/or communication interface(s) 138 may be provided as part of a shared resource pool that processor(s) 132 may communicate with via a network or other logical host interface. In some embodiments, storage device(s) 136 may be provided as part of a storage area network (SAN), network attached storage (NAS), or other remote storage platform, which processor(s) 132 may interface with over a network host interface. Processor(s) 132, for example, can utilize an Internet Small Computer Systems Interface (iSCSI) or various NVMe over Fabrics (NVMe-oF) (e.g., NVMe over Fiber, NVMe over Ethernet, NVMe over Infiniband, NVMe over TCP) to access storage device(s) 136. As another example, in some embodiments, processor(s) 132 may use an elastic fabric adapter (EFA) to interface with one or more communication interface(s) 138.

In some embodiments, memor(ies) 134 may include one or more memory modules, including for example, a dual in-line memory module (DIMM), a small outline DIMM (SO-DIMM), various types of non-volatile dual in-line memory modules (NVDIMMs), or the like. In some embodiments, memor(ies) 134 may include one or more input and output buffers where data for an application session may be written to, read from, or operated on. In some embodiments, storage device(s) 136 may include one or more of a solid-state drive (SSD), a flash drive, a universal serial bus (USB) flash drive, an embedded Multi-Media Controller (eMMC) drive, a Universal Flash Storage (UFS) drive, a secure digital (SD) card, a hard disk drive (HDD), or the like. In some embodiments, storage device(s) 136 may include one or more data stores (e.g., database, file repositories, etc.). In some embodiments, for example, storage device(s) 136 may include data stores in which input and output media streams and other application data for an application session may be stored.

In some embodiments, communication interface(s) 138 may include one or more network interfaces (e.g., an Ethernet interface, a Wi-Fi interface, a Bluetooth interface, a near field communication (NFC) interface, etc.) for communication over network 160 (e.g., a personal area network (PAN), a wireless PAN (WPAN), a low-power PAN (LP-PAN), a local area network (LAN), a wireless LAN (WLAN), a cellular network, a metropolitan area network (MAN), a wide area network (WAN), the Internet, or a combination thereof). In some embodiments, for example, application server 130, in conducting an application session, may communicate with one or more endpoints 110 over network 160 using communication interface(s) 138. For example, in conducting an application session, endpoints 110 and application server 130 may exchange different types of application data (e.g., as one or more information or data streams), including for example, control data (e.g., signaling or messages for controlling the manner in which the application session is conducted) and/or media data (e.g., audio, video, and/or other media streams for the application session). In some cases, application data may be exchanged over one or more logical communication channels established between endpoints 110 and application server 130 across network 160 (e.g., separate logical communication channels for each media stream and control signaling associated therewith).

For example, where application server 130 hosts a conferencing platform to facilitate communication sessions between endpoints 110, endpoints 110 and application server 130 may exchange call control and communications control signaling along with one or more media streams. Endpoints 110 and application server 130, for instance, may exchange call control signals to establish, setup, tear down a communication session, or perform other call control functions; communication control signals to exchange capability information (e.g., indicating the media stream processing capabilities of endpoints 110 and/or application server 130), negotiate and control a communication mode (e.g., a number, format, and manner in which media streams are communicated), and/or perform other communication control functions; and media streams for the communication session, including for example, one or more audio streams (e.g., containing digitized and coded speech), video streams (e.g., containing digitized and coded motion video), and/or data streams (e.g., containing pictures, documents, electronic whiteboard or other telematic application data, or other communication data).

An application session may be conducted in accordance with one or more protocols (e.g., standardized or proprietary protocols), which for example, may define the procedures used to establish an application session (e.g., the format and sequence of messages to be exchanged) and the manner in which application data is communicated (e.g., the type and format of application data that is exchanged) between endpoints 110 and application server 130. For example, where application server 130 hosts a conferencing platform, communication sessions (e.g., IP telephony calls, video conferences, etc.) may be conducted according to the H.323 protocol, SIP family of protocols, WebRTC, HTTP Live Streaming (HLS), Real-Time Streaming Protocol (RTSP), and/or other standardized or proprietary conferencing protocols (which may incorporate or rely upon other network layer, transport layer, and/or application layer protocols). In some cases, the application protocols may identify the types of media that may be exchanged (e.g., audio, video, and/or data), the different media formats that may be supported (e.g., specific media codecs and/or standard formats), and/or specific parameters or settings that may be used (e.g., codec profiles, frame rates, resolutions, etc.).

The application data exchanged between endpoints 110 and application server 130 as part of an application session may be formatted in a particular manner in order to allow the application data to be carried across network 160 (e.g., in accordance with the application protocols). In some cases, for example, network 160 may be a packet-based communication network, where data is carried across network 160 as a series of one or more data packets. In such cases, the application data (e.g., control data and/or media data) for an application session may be segmented into one or more units, which may be formed into data packets. The data packets, for example, may include a header, containing address and control information, and a payload containing the application data. The packet header, for instance, may include a source address, identifying the device sending the packet, and a destination address, identifying the device destined to receive the packet. These source and destination addresses may be used by network devices (e.g., routers, switches, gateways, etc.) in network 160 to direct the packets from their source to their destination. The packet headers may also include a source port number and a destination port number, which may be used to identify the application that generated the packet and the application that should receive the packet (e.g., allowing application server 130 to direct the packet to the appropriate application server agent 142 and/or application session).

In some embodiments, application server 130 may be a heterogeneous computing system that includes multiple types of processor(s) 132, including for example, one or more central processing units (CPUs), graphics processing units (GPUs), data processing units (DPUs), digital signal processors (DSPs), field-programmable gate arrays (FPGAs), or application specific integrated circuits (ASICs). Different types of processor(s) 132 may be able to perform certain computing tasks or handling particular processing loads more quickly and/or efficiently than others. DPUs, for instance, may be designed to perform certain networking and communication workloads (e.g., data transfer, data reduction, data encryption, data compression, etc.), such that their performance may be offloaded from CPUs. As another example, some processor(s) 132 may be able to perform media encoding and/or decoding tasks more quickly and/or efficiently than other processor(s) 132. For instance, given their parallel processing architectures, some GPUs may be able to perform media encoding and/or decoding tasks more quickly and/or efficiently than some CPUs, which may employ a serial processing architecture. In some cases, processor(s) 132 may include specialized processing units, blocks, or circuitry for performing media encoding operations, decoding operations, or both (which may be referred to as hardware encoders, hardware decoders, or individually and collectively as hardware codecs). Most modern GPUs (and some modern CPUs), for example, may include hardware codecs for performing media encoding and/or decoding operations. Different processor(s) 132 may have different hardware encoding and/or decoding capabilities. In some cases, for example, the hardware processing support provided by processor(s) 132 may depend on the type of media stream. Some processor(s) 132, for example, may provide hardware processing support for certain types of media (e.g., audio, video, etc.), certain types of processing (e.g., encode and decode, decode only, etc.), certain media formats or codecs (e.g., JPEG, MJPEG, H.262, H.264 (AVC), H.265 (MVC), H.265 (HEVC), VC1, VP8, VP9, etc.), use of certain codec profiles (e.g., H.264 Baseline, Main, High, High10, Extended, etc.) and/or certain codec features or options (e.g., quarter-pixel motion estimation, etc.), and/or other media stream parameters (e.g., up to a maximum resolution, frame rate, bit rate, color space and depth, etc.).

Processor(s) 132 may include processing logic 140, which may include one or more processing logic sub-components, that can be used to perform different processing operations. In some embodiments, for example, processing logic 140 may include an application server agent 142, a stream processing manager 144, a hardware encode engine 146, hardware decode engine 147, software encode engine 148 and software decode engine 149.

Application server agent 142 may be used to facilitate one or more application sessions in which media streams may be received and processed. In some embodiments, for example, application server agent 142 may provide an application service with which endpoints 110 may interface with to conduct an application session. In some embodiments, for example, application server agent 142 may provide a vision AI platform that endpoints 110 may interface with, for example, by providing media streams captured by cameras and/or other sensor(s) 116. The application server agent 142 may receive and process the streams, for example, to perform image classification, object detection and segmentation, and/or other computer vision tasks. As an illustrative example, application server agent 142 may host a traffic monitoring platform that may receive video streams from a network of traffic cameras and process the video streams to perform different traffic monitoring tasks (e.g., detecting traffic congestion, traffic violations, traffic accidents, etc.).

As another example, in some embodiments, application server agent 142 may host a conferencing platform that endpoints 110 may interface with to conduct a communication session, including for example, an IP telephony call, video conference, or other multimedia conference. In some embodiments, for example, application server agent 142 may receive input media streams from one or more conference participants, process the received media streams (e.g., decoding and optionally enhancing the input media streams, for example, to provide enhanced audio, video, augmented reality effects, or other enhancements, encoding output media streams, etc.), and transmit one or more output media streams to each conference participant. In some embodiments, for instance, application server agent 142 may operate as a selective forwarding unit (SFU), a multipoint control unit (MCU), and/or other conferencing entity used to facilitate or manage communication sessions (e.g., operating as a conferencing gateway, gatekeeper, multipoint controller (MC), multipoint processor (MP), border element, peer element, proxy server, redirect server, registrar, session border controller (SBC), etc.). In some embodiments, application server agent 142 may facilitate multiple communication sessions simultaneously and may receive, process, and transmit media streams between participants of the different communication sessions. In some embodiments, application server agent 142 may operate in a different role for different communication sessions (e.g., serving as a facilitator of one or more peer-to-peer (P2P) communication sessions, operating as an SFU for a set of communication sessions, operating as an MCU for another set of communication sessions, etc.).

Stream processing manager 144 may be used to manage one or more aspects of media stream processing for an application session (or multiple application sessions). In some embodiments, for example, stream processing manager 144 may be used to manage encoding and/or decoding of media streams for application server agent 142. In some embodiments, for example, application server agent 142 may provide one or more input media streams to stream processing manager 144 for decoding. As an illustrative example, where application server agent 142 provides a vision AI platform, media streams received from endpoints 110 (e.g., traffic cameras) may be provided to stream processing manager 144 for decoding. As another example, where application server agent 142 hosts a conferencing platform, media streams received from conference participants may be passed along to stream processing manager 144 to be decoded.

In some embodiments, application server agent 142 may instruct stream processing manager 144 to encode one or more output media streams (e.g., from decoded input media streams that have undergone processing). In some cases, application server agent 142 may also provide stream processing manager 144 with specific encoding parameters for encoding the output media streams, including for example, a codec type and codec profiles or options to be used, and/or other media stream parameters (e.g., a resolution, frame rate, bit rate, color space and depth). As an illustrative example, where application server agent 142 hosts a conferencing platform, application server agent 142 may instruct stream processing manager 144 to encode output media streams for transmission to each conference participant (e.g., from input media streams received from different conference participants that were decoded and enhanced through further processing). For instance, where application server agent 142 is operating as an SFU for a communication session between n conference participants, application server agent 142 may instruct stream processing manager 144 to encode n−1 output media streams for each conference participant (e.g., to encode processed input media streams of the other n−1 participants). Similarly, where application server agent 142 is operating as an MCU for a communication session between n conference participants, application server agent 142 may instruct stream processing manager 144 to encode n output media streams, one for each conference participant (e.g., with the processed input media streams of different conference participants being arranged in a desired layout).

In some embodiments, stream processing manager 144 may act as a layer between application server agent 142 and hardware encode/decode engines 146/147 and software encode/decode engines 148/149. Hardware encode/decode engines 146/147 may be used to encode/decode media streams (e.g., for an application session facilitated by application server agent 142) using hardware capabilities of application server 130 (e.g., using hardware codecs of processor(s) 132). Software encode/decode engines 148/149 may be used to encode/decode media streams using software capabilities of application server 130 (e.g., using software codecs executed by processor(s) 132).

Stream processing manager 144 may operate to assign processing of media streams (e.g., decoding of input media streams and/or encoding of output media streams) to either hardware encoding/decoding engines 146/147 or software decoding engines 148/149. In some embodiments, stream processing manager 144 may determine a processing assignment for media streams that is optimized with respect to one or more performance factors (e.g., that maximizes processing throughput, processing efficiency, and/or media stream quality). In some embodiments, stream processing manager 144 may dynamically reassign processing of a media stream between hardware and software decoding engines (e.g., from hardware encoding/decoding engines 146/147 to software decoding engines 148/149 and vice-versa). Because stream processing manager 144 may act as a layer between application server agent 142 and hardware encode/decode engines 146/147 and software encode/decode engines 148/149, the determination of an optimal processing assignment and the dynamic reassignment of processing of media streams therebetween may be transparent to application server agent 142. Thus, consideration need not be given to how to optimize media stream processing when developing application server agent 142—an otherwise laborious undertaking requiring detailed knowledge of the hardware components of the application server on which it may run (something that is rarely known at the time of development)—and application developers may rely on the stream processing manager 144 to provide such optimization instead.

In some embodiments, stream processing manager 144 may determine a processing assignment (e.g., for decoding an input media stream or encoding an output media stream) based on one or more parameters, including for example, one or more performance state parameters of application server 130 or components therein (e.g., hardware utilization levels, temperature levels, power consumption levels, etc.), performance capability parameters of application server 130 (e.g., hardware codec capabilities of different processor(s) 132), media stream parameters (e.g., media type, codec type, codec profiles, features, or options, or other media stream parameters), other application parameters, or a combination thereof.

In some embodiments, for example, stream processing manager 144 may determine one or more parameters that reflect a performance state of application server 130. In some embodiments, for example, stream processing manager 144 may measure or estimate one or more hardware utilization levels, temperature levels, power consumption levels, and/or other performance levels of application server 130, as a whole and/or with respect to individual hardware components therein (e.g., of processor(s) 132, memor(ies) 134, storage device(s) 136, or communication interface(s) 138). In some embodiments, for instance, stream processing manager 144 may measure or estimate a processor utilization level of different processor(s) 132, on the whole and/or with respect to certain processing units, blocks or circuitry therein (e.g., with respect to hardware codecs therein), a memory utilization level of memor(ies) 134 (e.g., a system memory utilization level and/or a GPU memory utilization level), and/or other hardware utilization levels (e.g., of storage device(s) 136 or communication interface(s) 138). By way of example, a processor utilization level may indicate a number of active processor cycles or a ratio (or percentage) of active to available processor cycles, and a memory utilization level may indicate an amount of memory consumed or a ratio (or percentage) of consumed memory to available memory. In some embodiments, stream processing manager 144 may obtain the performance levels by requesting or reading the values from a system, device, or component management interface (e.g., a CPU or GPU management interface) and/or computing the performance levels therefrom. In some cases, stream processing manager 144 may determine an instantaneous performance level (e.g., an instantaneous temperature), while in others, stream processing manager 144 may determine an average performance level over a period of time (e.g., an average processor utilization level over the past 5 seconds).

In some embodiments, stream processing manager 144 may determine a processing assignment of a media stream based on the determined performance state parameters. In some embodiments, for example, stream processing manager 144 may preferentially assign processing of a media stream to hardware encoding/decoding engines 146/147 (as they may affect processing more quickly and/or efficiently than software encoding/decoding engines 148/149), unless the performance state parameters indicate that one or more quality-of-service (QOS) factors (e.g., a frame drop rate, a processing latency, a video quality, etc.) will not be met (or is unlikely to be met). For example, when the hardware codecs of processor(s) 132 become overloaded-which, for example, may be reflected by an elevated hardware utilization level (e.g., where a utilization level of a hardware codec is above a threshold), temperature level (e.g., where a temperature of a processor 132 is above a threshold), and/or power consumption level (e.g., where a power draw by processor 132 is greater than a threshold amount)—an increased number of frame drops may occur or a quality (e.g., a resolution or frame rate) may be automatically reduced (e.g., to mitigate the overload condition). In such cases, stream processing manager 144 may instead assign processing of the media stream to software encoding/decoding engines 148/149, which may allow for processing of the media stream while maintaining the desired QoS.

In some embodiments, stream processing manager 144 may determine a processing assignment of a media stream based on parameters regarding the type of media stream being processed (or media stream parameters). In some embodiments, for example, stream processing manager 144 may determine a processing assignment based on a type of media, a media format (e.g., a type of codec, a codec profile, and/or specific codec features or options used to encode the media stream), and/or other media stream parameters (e.g., a resolution, frame rate, color depth, etc.) based on which a processing assignment may be made. In some cases, for example, stream processing manager 144 may preferentially assign processing of low-resolution media streams (e.g., CIF, QVGA, VGA, D1) to software encoding/decoding engines 148/149, as such media streams may be more readily processed by software encoding/decoding engines 148/149 (e.g., without impacting QoS) and/or may derive less benefit (e.g., processing speed and/or efficiency gain) from being processed by hardware encoding/decoding engines 146/147. With regard to input media streams, stream processing manager 144 may determine the type of media, media format, and/or other media stream parameters by analyzing the input media stream (e.g., metadata of the media stream), control messages or signaling associated therewith, or both. As for output media streams, such parameters may be provided to stream processing manager 144 by application server agent 142 (e.g., when instructing stream processing manager 144 to encode the output stream).

In some embodiments, stream processing manager 144 may determine a processing assignment of a media stream based on the performance capabilities of application server 130. In some embodiments, for example, stream processing manager 144 may consider the hardware processing support provided by processor(s) 132, including for example, the types of media, types of processing, types of codecs, codec profiles, features or options, and other media stream parameters that may be supported in hardware. Stream processing manager 144 may preferentially assign processing of media streams supported by hardware codecs of processor(s) 132 to hardware encoding/decoding engines 146/147 and other types of media streams to software encoding/decoding engines 148/149. By way of example, processor(s) 132 may support encoding and decoding of H.264 video streams and decode only support for H.265 (HEVC) video streams. In such cases, stream processing manager 144 may assign processing of H.264 video streams to hardware encoding/decoding engines 146/147, encoding of H.265 video streams to software encoding engine 148, and decoding of H.265 video streams to hardware decoding engine 147.

In some embodiments, stream processing manager 144 may determine a processing assignment of a media stream based on one or more parameters regarding the application session(s) being conducted using application server agent 142 (or application parameters). By way of example, in embodiments where application server 130 hosts a conferencing platform, stream processing manager 144 may determine a processing assignment based on different parameters of the communications session(s) being conducted. In some embodiments, for instance, stream processing manager 144 may make a processing assignment determination based on consideration of a type of communication session or role of application server agent 142 therein (e.g., a P2P communication session, SFU session, MCU session, etc.) and/or different parameters of each communication session, including for example, a number of conference participants, a connection quality of each participant (e.g., geographic location, connection latency, available network bandwidth, etc.).

For example, an SFU communication session may involve encoding and transmitting a larger number of media streams (e.g., generating $n^2-n$ output media streams) than an MCU communication session (e.g., generating n output media streams). In some embodiments, stream processing manager 144 may determine that changing the mode of the communication session (e.g., from SFU to MCU or vice versa) may improve an overall processing optimality (e.g., allowing encoding of the media streams to be assigned to hardware encoding engine 146). In such cases, stream processing manager 144 may instruct application server agent 142 to change the mode of the communication session and may determine an optimal processing assignment thereafter (e.g., based on new encoding instructions returned by application server agent 142). In some cases, application server agent 142 may be hosting additional communication sessions (e.g., that may involve relatively fewer or greater number of conference participants) and stream processing manager 144 may adjust assignment of the media streams from those communication sessions accordingly (e.g., re-assigning processing from hardware encoding/decoding engines 146/147 to software encoding/decoding engines 148/149 or vice versa), as discussed in further detail herein.

As another example, in some embodiments, stream processing manager 144 may consider the connection quality parameters of conference participants in determining a processing assignment. Connection quality parameters, for instance, may affect a latency or quality of the media streams exchanged as part of a communication session. Stream processing manager 144 may use the connection quality parameters (e.g., geographic location, connection latency, available network bandwidth, etc.) to determine media stream parameters for encoding output media streams (e.g., a video resolution and bitrate) and further whether to assign processing of the media streams to hardware or software encoding engines 146/148. In some embodiments, for instance, application server agent 142, for instance, may provide stream processing manager 144 with constraints for different encoding media stream parameters but may allow stream processing manager 144 to determine the specific media stream parameters to be used. By way of example, application server agent 142 may provide stream processing manager 144 with minimum quality requirements (e.g., a minimum resolution and bitrate) and/or request stream processing manager 144 to encode a media stream at a highest quality possible (e.g., at as high a resolution and bitrate as possible). In such cases, stream processing manager 144 may consider connection quality parameters for each participant in determining one or more encoding media stream parameters and further whether to assign processing of the media streams to hardware or software encoding engines 146/148. In other embodiments, application server agent 142 may determine appropriate encoding media stream parameters based on the connection quality parameters of the conference participants (and/or in accordance with a desired QoS) and stream processing manager 144 may operate to assign processing of the media streams based thereon. In some cases, a connection quality of a conference participant may change during a communication session and the determined media stream parameters (e.g., a video resolution and/or bitrate) may be adjusted accordingly (e.g., by application server agent 142 or stream processing manager 144). In response to such changes, stream processing manager 144 may adjust a processing assignment of the media streams accordingly (e.g., re-assigning processing from hardware encoding/decoding engines 146/147 to software encoding/decoding engines 148/149 or vice versa), as discussed in further detail herein.

In some embodiments, stream processing manager 144 may assign processing of media streams as they are received from application server agent 142. As an illustrative example, as part of a multimedia communications session (e.g., a video conference) between n endpoints 110, application server agent 142 may provide stream processing manager 144 with n audio and video streams for decoding (e.g., received from each conference participant) and instruct stream processing manager 144 to encode n audio and video streams (e.g., for output to each conference participant). In some embodiments, the media streams may be placed into a queue for assignment. In some embodiments, stream processing manger 144 may determine processing assignments for each media streams in serial fashion (e.g., assign processing of media streams one after another).

In some embodiments, stream processing manager 144 may determine an optimal processing assignment for a media stream, for example, based on one or more of the parameters discussed above. Stream processing manager 144, for example, may preferentially assign processing of a media stream to hardware encoding/decoding engines 146/147, unless one or more performance state parameters (e.g., hardware utilization levels, temperature levels, power consumption levels, etc.) indicate an overload condition (e.g., indicating that the hardware codecs of processor(s) 132 are overloaded or will become overloaded upon assignment of the media stream), in which case processing of the media stream may be assigned to software encoding/decoding engines 148/149. As another example, stream processing manager 144 may compare the performance capability parameters of application server 130 (e.g., hardware codec capabilities of different processor(s) 132) with media stream parameters of the media stream being assigned to determine whether hardware processing of the media stream is supported. If hardware processing is supported, stream processing manager 144 may preferentially assign processing of the media stream to hardware encoding/decoding engines 146/147 (e.g., unless the performance state parameters indicate an overload condition); and if not supported, stream processing manager 144 may assign processing of the media stream to software encoding/decoding engines 148/149.

In some embodiments, stream processing manager 144 may consider existing processing assignments in assessing the optimality of a processing assignment and may dynamically reassign processing of media streams in order to achieve an optimal processing assignment. As an illustrative example, in determining a processing assignment of a current media stream, stream processing manager 144 may look to preferentially assign processing of the current media stream to hardware encoding/decoding engines 146/147 but may determine that an overload condition would result (e.g., based on an analysis of one or more performance state parameters). Stream processing manager 144 may consider whether reassigning processing of one or more existing media streams (e.g., low-resolution streams) to software encoding/decoding engines 148/149 would permit assignment of the current media stream (e.g., a high-resolution stream) to hardware encoding/decoding engines 146/147 (e.g., without resulting in an overload condition) while improving an overall processing optimality.

In some embodiments, stream processing manager 144 may determine a processing assignment in response to detecting different media stream configuration events (e.g., upon detection of an overload condition, a change in a number of media streams being processed, a change in the media stream parameters of media streams being processed, etc.). In some embodiments, for example, stream processing manager 144 may initiate a processing assignment determination upon receipt of an additional media stream for processing (e.g., when a new participant joins a communication session, when a new communication session is initiated, etc.), upon removal of a media stream from processing (e.g., when a participant ends a communication session), and/or upon a change in one or more parameters of an existing media stream (e.g., a change in a format of an input media stream or desired output media stream).

For instance, in some embodiments, in response to detecting receipt of an additional media stream for processing, stream processing manager 144 may assign processing of the additional media stream in a similar manner to that previously described—e.g., with processing being preferentially assigned to hardware encoding/decoding engines 146/147, unless performance state parameters indicate that an overload condition would result and/or a comparison of the performance capability parameters of application server 130 with the media stream parameters indicate that hardware processing of the media stream is not supported, and existing processing assignments being dynamically reassigned as needed in order to achieve an overall processing optimality.

In some embodiments, in response to detecting removal of a media stream from processing, stream processing manager 144 may evaluate an optimality of remaining processing assignments and may dynamically reassign processing of the remaining media streams in order to achieve an overall processing optimality. For example, where processing of a removed media stream was assigned to hardware encoding/decoding engines 146/147, stream processing manager 144 may preferentially reassign processing of one or more media streams from software encoding/decoding engines 148/149 to hardware encoding/decoding engines 146/147 (e.g., unless performance state parameters indicate that an overload condition would result or hardware processing for the existing media streams is not supported).

In some embodiments, in response to detecting changes in media stream parameters (e.g., a change in a resolution and/or bitrate), stream processing manager 144 may evaluate an optimality of current processing assignments and may dynamically reassign processing of media streams in order to achieve an overall processing optimality. In some embodiments, for example, stream processing manager 144 may treat the configuration event as the removal of a media stream from processing and the addition of a new media stream for processing.

In some embodiments, stream processing manager 144 may monitor a performance state of the application server and initiate a processing assignment determination when certain conditions are met. Stream processing manager 144, for example, may initiate a processing assignment determination when a performance state of the application server indicates that one or more quality-of-service (QOS) factors (e.g., a frame drop rate, a processing latency, an encoding bitrate, etc.) is not being met (or is not likely to be met). In some embodiments, for example, stream processing manager 144 may monitor performance levels (e.g., hardware utilization levels, temperature levels, power consumption levels, etc.) of different application server components (e.g., of processor(s) 132, memor(ies) 134, etc.) and initiate a processing assignment determination when certain threshold criteria are met (e.g., indicating an overload condition). Stream processing manager 144, for instance, may initiate a processing assignment determination when a utilization level (e.g., of a GPU processor) exceeds a particular threshold (e.g., above 90% utilization) and/or remains above a particular threshold level for an extended period of time (e.g., where an average utilization rate across a 15 second window is above 80%). In some embodiments, for example, in response to determining that a QoS is not being met (or is not likely to be met), stream processing manager 144 may evaluate an optimality of current processing assignments and may dynamically reassign processing of media streams in order to maintain the desired QoS (e.g., reassigning processing of media streams from hardware encoding/decoding engines 146/147 to software encoding/decoding engines 148/149 upon detection of an overload condition).

In some embodiments, application server agent 142 may process media streams (e.g., decoded input media streams) in conducting an application session. In some embodiments, for example, where application server agent 142 provides a vision AI platform, application server agent 142 may process decoded media streams received from endpoints 110 in support of different practical applications. In some embodiments, for example, the application server agent 142 may process the video streams through one or more AI/machine learning models, for example, to perform image classification (e.g., using an EfficientNet or ResNet model), object detection (e.g., using a RetinaNet or YOLOV3/V4 model) and segmentation (e.g., using a UNET MaskRCNN model), and/or other computer vision tasks (e.g., people detection, vehicle classification, automatic license plate recognition, 2D\3D pose estimation, automatic speech recognition, etc.). As another example, in embodiments where application server agent 142 provides a conferencing platform, application server agent 142 may process decoded media streams received from conference participants (e.g., from endpoints 110) to enhance the communication session. In some embodiments, for instance, application server agent 142 may process media streams of conference participants to provide enhanced audio (e.g., improved audio resolution, echo cancellation, noise removal, speaker focus, etc.), enhanced video (e.g., improved video resolution, detail enhancement, artifact reduction, video noise removal, virtual background (or AI green screen), etc.), augmented reality effects (e.g., face tracking, facial expression estimation, body pose estimation, eye contact simulation, avatar simulation, etc.), and/or other enhancements (e.g., real-time translation, speech-to-text\text-to-speech conversion, etc.).

In some embodiments, processing logic 140 may implement one or more stream processing pipelines, which may include a number of processing stages that may be connected together to affect media stream processing for an application session. Each processing stage may accept a number of inputs, perform a number of sub-processes or operations using the inputs, and generate a number of outputs. The outputs of one stage may be provided to one or more other stages to form the media stream processing pipeline. In some embodiments, for example, each processing stage may maintain one or more buffers to store inputs that are received and outputs that may be generated for a processing stage and utilize one or more queues to send outputs to a subsequent processing stage (or subsequent processing stages) in the processing pipeline. In some cases, an output buffer of one processing stage may be treated as an input buffer of another processing stage, which may allow for in place processing between stages and reduce an overall memory burden.

In some embodiments, for example and without limitation, processing logic 140 may implement stream processing pipeline 150, which at a high level may involve a receive input streams stage 151, decode input streams stage 152, process decoded streams stage 153, encode output streams stage 154, and transmit output streams stage 155. Additional detail regarding the processing stages of stream processing pipeline 150 is provided by way of example in the discussion herein. Stream processing pipeline 150, however, is not intended to represent a complete processing pipeline, and one or more additional stages may be included in (and/or operations may be performed in a stage of) stream processing pipeline 150 or in addition to stream processing pipeline 150. Such additional stages and/or operations may include, for example, a stream capture stage in which the media stream is captured (e.g., by endpoints 110) or a display stage in which the results of the processing are presented to a user (e.g., on a display 117 of endpoint 110). Such stages and/or operations are not material to the understanding of the present disclosure and have been omitted for the sake of clarity and brevity. However, it should be understood that the stream processing pipeline 150 may include additional stages and/or operations, which may be performed before, between, as part of, and/or after those enumerated herein.

At receive input streams stage 151, application server agent 142 may operate to receive application data from one or more endpoints 110 as part of an application session (or multiple application sessions). The application data may include one or more input media streams (e.g., one or more audio, video, and/or other media streams for the application session). In some embodiments, for example, a traffic monitoring platform provided by application server agent 142 may receive video streams from a network of traffic cameras, which may be processed to perform different traffic monitoring tasks (e.g., detecting traffic congestion, traffic violations, traffic accidents, etc.). As another example, a conferencing platform hosted by application server agent 142 may receive one or more media streams-including audio, video, and/or data streams (e.g., for electronic whiteboard or other telematic applications—from each participant in a multimedia communication session. In some cases, the application data may also include control data (e.g., signaling or messages for controlling the manner in which the application session is conducted). For example, as part of a multimedia communication session, endpoints 110 may transmit control messages in order to establish a communication session, exchange capability information, and negotiate a communication mode, which may identify a number and type of media streams to be exchanged (e.g., an audio and video stream for each conference participant) along with a format of each media stream (e.g., including a codec type, codec profiles, features, or options used to encode the media stream) and/or other media stream parameters (e.g., a resolution, frame rate, color space and depth, etc.). Application server agent 142 may provide the received input media streams as an input to decode input streams stage 152.

At decode input streams stage 152, stream processing manager 144 may operate to decode received input streams (e.g., provided by application server agent 142). In some embodiments, for example, stream processing manager 144 may assign decoding of the received input streams to either hardware decoding engine 147 or software decoding engine 149. In some embodiments, stream processing manager 144 may place the received input media streams into a queue and determine a processing assignment for each input media stream in serial fashion.

In some embodiments, stream processing manager 144 may determine an optimal processing assignment for a media stream, for example, based on one or more parameters. In some embodiments, for instance, stream processing manager 144 may determine a processing assignment based on one or more performance state parameters of application server 130 or components therein (e.g., hardware utilization levels, temperature levels, power consumption levels, etc.), performance capability parameters of application server 130 (e.g., hardware codec capabilities of different processor(s) 132), media stream parameters (e.g., media type, codec type, codec profiles, features, or options, or other media stream parameters), other application parameters, or a combination thereof. In some embodiments, for example, stream processing manager 144 may preferentially assign processing of an input media stream to hardware decoding engine 147, unless one or more performance state parameters indicate that an overload condition would result and/or a comparison of the performance capability parameters of application server 130 with the media stream parameters of the input media stream being assigned indicate that hardware processing of the input media stream is not supported, in which case stream processing manager 144 may assign processing of the input media stream to software decoding engine 149.

In some embodiments, stream processing manager 144 may consider existing processing assignments in assessing the optimality of a processing assignment and may dynamically reassign processing of media streams in order to achieve an optimal processing assignment. For example, if stream processing manager 144 determines that assigning processing of an input media stream to hardware decoding engine 147 would result in an overload condition, it may analyze existing processing assignments (e.g., existing encoding assignments, decoding assignments, or both) to determine whether reassigning processing of one or more existing media streams to software decoding engine 149 would permit assignment of the input media stream to hardware decoding engine 147 (e.g., without resulting in an overload condition) while improving an overall processing optimality (e.g., reassigning processing of low-resolution media streams to software encoding/decoding engines 148, 149 and assigning a high-resolution input media stream to hardware decoding engine 147). Stream processing manager 144 may return decoded input media streams (or decoded media streams) to application server agent 142 for further processing. In some embodiments, for example, application server agent 142 may provide the decoded media streams as inputs to process decoded streams stage 153.

At process decoded streams stage 153, application server agent 142 may operate to process decoded media streams (e.g., decoded input media streams returned by stream processing manager 144) in support of an application session. For example, in embodiments where application server agent 142 provides a vision AI platform, application server agent 142 may process decoded video streams in support of different practical applications (e.g., to create a frictionless retail experience, streamline inventory management, facilitate traffic engineering in smart cities, perform optical inspection on factory floors, improve patient care in healthcare facilities, and/or other practical applications). In some embodiments, for instance, application server agent 142 may process decoded video streams through one or more AI/machine learning models, for example, to perform image classification (e.g., using an EfficientNet or ResNet model), object detection (e.g., using a RetinaNet or YOLOV3/V4 model) and segmentation (e.g., using a UNET MaskRCNN model), and/or other computer vision tasks (e.g., people detection, vehicle classification, automatic license plate recognition, 2D\3D pose estimation, automatic speech recognition, etc.). As another example, in embodiments where application server agent 142 provides a conferencing platform, application server agent 142 may process decoded media streams to enhance a communication session. In some embodiments, for instance, application server agent 142 may process media streams of conference participants to provide enhanced audio (e.g., improved audio resolution, echo cancellation, noise removal, speaker focus, etc.), enhanced video (e.g., improved video resolution, detail enhancement, artifact reduction, video noise removal, virtual background (or AI green screen), etc.), augmented reality effects (e.g., face tracking, facial expression estimation, body pose estimation, eye contact simulation, avatar simulation, etc.), and/or other enhancements (e.g., real-time translation, speech-to-text\text-to-speech conversion, etc.). In some embodiments, application server agent 142 may affect processing of media streams (e.g., decoded input media streams) through an application processing pipeline. While examples of such application processing pipelines are described herein (e.g., with regard to FIGS. 3-5), it will be appreciated that such examples are merely illustrative and that application processing pipelines may vary depending on the embodiment and its practical application. Application server agent 142 may provide processed media streams as an input to encode output streams stage 154.

At encode output streams stage 154, stream processing manager 144 may operate to encode one or more output media streams (e.g., from one or more processed media streams provided by application server agent 142). In some cases, application server agent 142 may provide stream processing manager 144 with specific encoding parameters for encoding the output media streams, including for example, a codec type and codec profiles or options to be used, certain media stream parameters (e.g., a resolution, frame rate, bit rate, color space and depth), and other application specific encoding parameters (e.g., a desired media stream layout). For example, in embodiments where application server agent 142 hosts a conferencing platform, application server agent 142 may instruct stream processing manager 144 to generate one or more output media streams for each conference participant and may provide specific encoding parameters for the output media streams, including for example, a codec type and codec profiles or options to be used, and/or other media stream parameters (e.g., a resolution, frame rate, bit rate, color space and depth).

In some embodiments, stream processing manager 144 may assign encoding of output media streams to either hardware encoding engine 146 or software decoding engine 148. In some embodiments, stream processing manager 144 may place output media streams into a queue (e.g., as instructions for encoding the output streams are received from application server agent 142) and may determine a processing assignment for each output media stream in serial fashion. In some embodiments, stream processing manager 144 may determine an optimal processing assignment for a media stream based on one or more parameters (e.g., based on one or more performance state parameters, capability parameters of application server 130, encoding parameters of the output media stream being assigned, and/or other application parameters). In some embodiments, for example, stream processing manager 144 may preferentially assign processing of an output media stream to hardware encoding engine 146, unless one or more performance state parameters indicate that an overload condition would result and/or a comparison of the performance capability parameters of application server 130 with the encoding parameters of the output media stream being assigned indicate that hardware processing of the output media stream is not supported, in which case stream processing manager 144 may assign processing of the output media stream to software encoding engine 148.

In some embodiments, stream processing manager 144 may consider existing processing assignments in assessing the optimality of a processing assignment and may dynamically reassign processing of media streams in order to achieve an optimal processing assignment. For example, if stream processing manager 144 determines that assigning processing of an output media stream to hardware encoding engine 146 would result in an overload condition, it may analyze existing processing assignments (e.g., existing encoding assignments, decoding assignments, or both) to determine whether reassigning processing of one or more existing media streams to software encoding engine 148 would permit assignment of the output media stream to hardware encoding engine 146 (e.g., without resulting in an overload condition) while improving an overall processing optimality (e.g., reassigning processing of low-resolution media streams to software encoding/decoding engines 148, 149 and assigning a high-resolution output media stream to hardware encoding engine 146). Stream processing manager 144 may return encoded output streams (or output streams) to application server agent 142, which may provide the output transmit output streams stage 155.

At transmit output streams stage 155, application server agent 142 may operate to transmit application data to one or more endpoints 110 as part of an application session (or multiple application sessions). The application data may include one or more output media streams (e.g., provided by stream processing manager 144). In some embodiments, for example, where application server agent 142 hosts a conferencing platform, application server agent 142 may transmit one or more output media streams to each participant of a communication session (e.g., to endpoints 110). In some cases, the application data may also include control data (e.g., signaling or messages for controlling the manner in which the application session is conducted).

Turning now to endpoints 110, endpoints 110 can take a variety of forms depending on the embodiment and its application, including for example, a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or other computing device.

In some embodiments, an endpoint 110 may include one or more processor(s) 112 that may be coupled to and communicate with one or more memor(ies) 114, storage device(s) 116, and/or communication interface(s) 118. In some embodiments, an endpoint 110 may be a heterogeneous computing system that includes multiple types of processor(s) 132, including for example, one or more central processing units (CPUs), graphics processing units (GPUs), data processing units (DPUs), digital signal processors (DSPs), field-programmable gate arrays (FPGAs), or application specific integrated circuits (ASICs).

In some embodiments, processor(s) 112 may include one or more cores, one or more caches, a memory controller (e.g., NVDIMM controller), and a storage protocol controller (e.g., PCIe controller, SATA controller). In some embodiments, processor(s) 112 may be coupled to and communicate with memor(ies) 114, storage device(s) 116, and/or communication interface(s) 118 via a physical host interface, including for example, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface may provide an interface over which control, address, data, and other signals may be communicated between processor(s) 112 and memor(ies) 114, storage device(s) 116, and/or communication interface(s) 118. In some embodiments, processor(s) 112 may utilize an NVM Express (NVMe) interface to access components (e.g., storage device(s) 116) coupled with the processor(s) 112 by the physical host interface (e.g., PCIe bus).

In some embodiments, memor(ies) 114 may include one or more memory modules, including for example, a dual in-line memory module (DIMM), a small outline DIMM (SO-DIMM), various types of non-volatile dual in-line memory modules (NVDIMMs), or the like. In some embodiments, memor(ies) 114 may include one or more input and output buffers where data for an application session may be written to, read from, or operated on. In some embodiments, storage device(s) 116 may include one or more of a solid-state drive (SSD), a flash drive, a universal serial bus (USB) flash drive, an embedded Multi-Media Controller (eMMC) drive, a Universal Flash Storage (UFS) drive, a secure digital (SD) card, a hard disk drive (HDD), or the like. In some embodiments, storage device(s) 116 may include one or more data stores (e.g., database, file repositories, etc.). In some embodiments, for example, storage device(s) 116 may include data stores in which application data for an application session may be stored.

In some embodiments, communication interface(s) 118 may include one or more network interfaces (e.g., an Ethernet interface, a WiFi interface, a Bluetooth interface, a near field communication (NFC) interface, etc.) for communication over network 160 (e.g., a personal area network (PAN), a wireless PAN (WPAN), a low-power PAN (LP-PAN), a local area network (LAN), a wireless LAN (WLAN), a cellular network, a metropolitan area network (MAN), a wide area network (WAN), the Internet, or a combination thereof). In some embodiments, for example, endpoints 110, in conducting an application session, may communicate with application server 130 over network 160 using communication interface(s) 118. For example, as previously discussed, in conducting an application session, endpoints 110 and application server 130 may exchange different types of application data, including for example, control data and/or media data. For example, where application server 130 hosts a conferencing platform to facilitate communication sessions between endpoints 110, endpoints 110 and application server 130 may exchange call control and communications control signaling along with one or more media streams. In some cases, application data may be exchanged over one or more logical communication channels established between endpoints 110 and application server 130 across network 160 (e.g., separate logical communication channels for each media stream and control signaling associated therewith).

Endpoints 110 may conduct an application session with application server 130 according to one or more protocols (e.g., standardized or proprietary protocols), which for example, may define the procedures used to establish an application session (e.g., the format and sequence of messages to be exchanged) and the manner in which application data is communicated (e.g., the type and format of application data that is exchanged) between endpoints 110 and application server 130. In some cases, the application protocols may identify the types of media that may be exchanged (e.g., audio, video, and/or data), the different media formats that may be supported (e.g., specific media codecs and/or standard formats), and/or specific parameters or settings that may be used (e.g., codec profiles, frame rates, resolutions, etc.).

Figure 2:
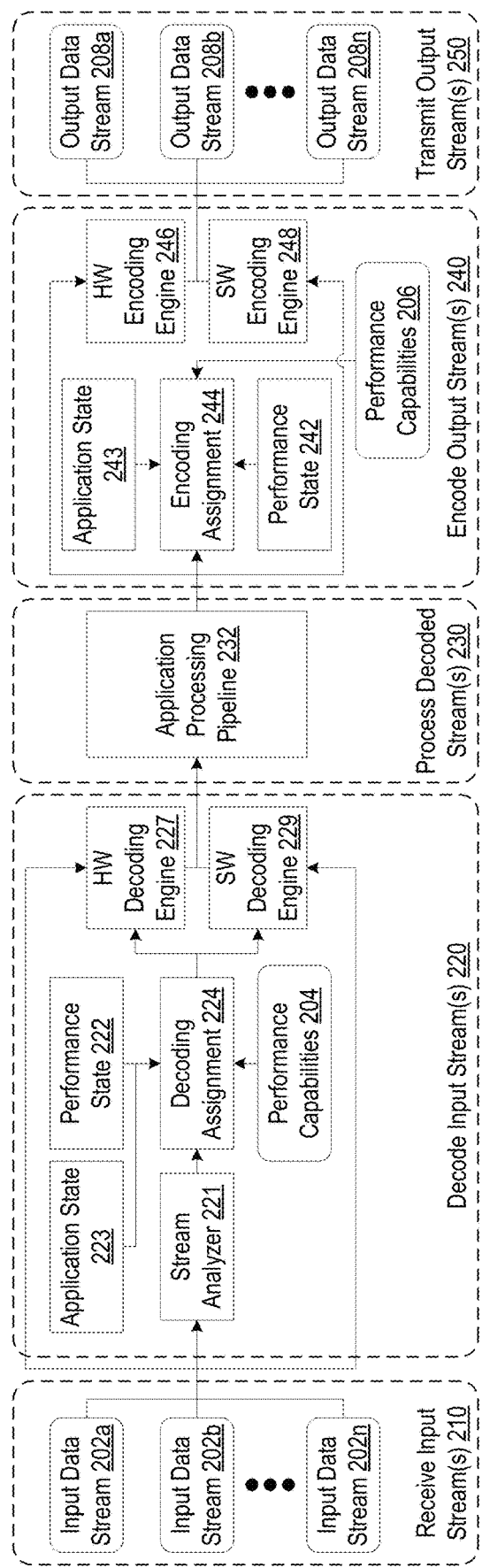
FIG. 2 illustrates a block diagram of an example media stream processing pipeline, according to at least one embodiment.

FIG. 2 illustrates a block diagram of an example media stream processing pipeline 200, according to at least one embodiment. At a high level, media stream processing pipeline 200 may involve receiving input streams (at receive input stream(s) stage 210), decoding the input streams (at decode input stream(s) stage 220), processing the decoded streams (at process decoded stream(s) stage 230), encoding output streams (at encode output stream(s) stage 240) and transmitting the output streams (at transmit output stream(s) stage 250).

At receive input stream(s) stage 210, one or more input streams 202a-202n may be received (e.g., from endpoints 110 by application server agent 142 of application server 130) as part of an application session (or multiple application sessions). In some embodiments, input streams 202a-202n may include one or more media streams, which may contain audio, video, and/or other data for an application session. In some cases, the input streams 202a-202n may also include one or more control streams (e.g., associated with an application session as a whole and/or individual media streams provided as part thereof), which may carry signaling or messages that identify a number and type of media streams exchanged in an application session along with a format of each media stream (e.g., including a codec type, code profiles, features, or options used to encode the media stream) and/or other media stream parameters (e.g., a resolution, frame rate, color space and depth, etc.). The input streams 202a-202n received at receive input stream(s) stage 210 may be provided as an input to decode input stream(s) stage 220.

At decode input stream(s) stage 220, the input streams 202a-202n (or a sub-set thereof) may be provided to stream analyzer 221. In some embodiments, stream analyzer 221 may operate to analyze the input streams 202a-202n (or sub-set thereof) to identify a number and type of media streams that were received along with different media stream parameters for each media stream. Stream analyzer 221, for instance, may determine a format of each media stream (e.g., a codec type and codec profiles, features, or options used to encode the media stream) and other media stream parameters (e.g., a resolution, frame rate, color space and depth, etc.). Stream analyzer 221 may determine media stream parameters based on an analysis of the media stream itself (e.g., based on metadata information provided as part of the media stream) and/or control streams associated with the media stream or application session. The media stream parameters determined by stream analyzer 221 may be provided to decoding assignment 224.

Decoding assignment 224 may also accept performance capabilities 204 as an input as well as inputs from performance state 222 and application state 223. In some embodiments, for example, performance capabilities 204 of the system or device on which hardware decoding engine 227 and/or software decoding engine 229 may operate (for convenience, "decoding system") may be retrieved from a memory or storage device (e.g., from memor(ies) 134 or storage device(s) 136 of application server 130). Performance capabilities 204, for example, may indicate hardware processing support provided by the decoding system, including for example, the types of media, types of processing, types of codecs, codec profiles, features or options, and other media stream parameters that may be supported in hardware (e.g., by processor(s) 132 of application server 130).

In some embodiments, performance state 222 may operate to determine one or more performance state parameters of the decoding system. In some embodiments, for example, performance state 222 may measure or estimate one or more hardware utilization levels, temperature levels, power consumption levels, and/or other performance levels of the decoding system (as a whole and/or with respect to individual hardware components therein). In some embodiments, for instance, performance state 222 may obtain performance levels by requesting or reading the values from a system, device, or component management interface (e.g., a CPU or GPU management interface) and/or computing the performance levels therefrom. In some cases, performance state 222 may determine an instantaneous performance level (e.g., an instantaneous temperature), while in others, it may determine an average performance level over a period of time (e.g., an average processor utilization level over the past 5 seconds).

In some embodiments, application state 223 may operate to determine one or more application state parameters regarding the application session (or application sessions) being supported by the decoding system. In some embodiments, for example, application state 223 may determine parameters regarding the application session associated with the input media stream being decoded along with parameters regarding other application sessions being supported by the decoding system. As an illustrative example, with regard to a conferencing platform used to conduct one or more communication sessions, applications state 223 may determine a type of each communication session and a role of the decoding system therein (e.g., whether a communication session is a P2P communication session, SFU session, MCU session, etc.) and/or different parameters of each communication session (e.g., a number of conference participants, a geographic location of each participant, a connection quality of each participant and/or network demands of the communication session, etc.).

Decoding assignment 224 may operate to assign decoding of each input media stream to either hardware decoding engine 227 or software decoding engine 229, which may be used to decode input media streams to generate decoded media stream. Hardware decoding engine 227 and software decoding engine 229 may decode input media streams using hardware and software capabilities, respectively, of the decoding system. In some embodiments, for example, input media streams may be placed into a queue, and decoding assignment 224 may determine a decoding assignment for each input media stream in serial fashion. In some embodiments, decoding assignment 224 may determine an optimal decoding assignment of an input media stream based on the media stream parameters provided by stream analyzer 221, as well as performance state parameters and performance capability parameters of the decoding system and application state parameters provided by performance state 222, performance capabilities 204, and application state 223, respectively.

In some embodiments, for example, decoding assignment 224 may preferentially assign decoding of an input media stream to hardware decoding engine 227, unless one or more performance state parameters indicate that an overload condition would result and/or a comparison of performance capabilities 204 and the media stream parameters provided by stream analyzer 221 indicate that hardware decoding of the input media stream is not supported, in which case decoding assignment 224 may assign the input media stream to software decoding engine 229.

In some embodiments, decoding assignment 224 may consider existing processing assignments in assessing the optimality of a decoding assignment and may dynamically reassign processing of media streams in order to achieve an optimal processing assignment. For example, if decoding assignment 224 determines that assigning decoding of an input media stream to hardware decoding engine 227 would result in an overload condition, it may analyze existing processing assignments (e.g., existing encoding assignments, decoding assignments, or both) to determine whether reassigning processing of one or more media streams to software decoding engine 229 would permit assignment of the input media stream to hardware decoding engine 227 (e.g., without resulting in an overload condition) while improving an overall processing optimality. In some embodiments, where hardware encoding/decoding engines 246, 227 and software encoding/decoding engines 248, 229 operate on the same system or device, decoding assignment 224 may also consider whether reassigning encoding of some (e.g., one, two, etc.) or all of one or more output media streams (e.g., from hardware encoding engine 246 to software encoding engine 248) would permit assignment of the input media stream to hardware decoding engine 227 and improve an overall processing optimality. By way of example, decoding assignment 224 may improve overall throughput, processing efficiency, and media quality by reassigning processing of low-resolution media streams from hardware encoding/decoding engines 246, 227 to software encoding/decoding engines 248, 229 and assigning a high-resolution input media stream to hardware decoding engine 227. The decoded media streams produced by hardware decoding engine 227 and/or software decoding engine 229 may be provided as an input to process decoded stream(s) stage 230.

At process decoded stream(s) stage 230, decoded media streams (e.g., generated by hardware decoding engine 227 and/or software decoding engine 229) may be input into application processing pipeline 232, which may generate one or more processed media streams therefrom. Application processing pipeline 232 may affect processing of decoded media streams in support of an application session. In some embodiments, for example, application processing pipeline 232 may affect processing of decoded media streams as part of an application conducted by a vision AI platform (e.g., processing decoded media streams through one or more AI/machine learning models to perform image classification, object detection and segmentation, and/or other computer vision tasks). As another example, in some embodiments, application processing pipeline 232 may affect processing decoded media streams as part of a communication session facilitated by a conferencing platform (e.g., processing decoded media streams of conference participants to provide enhanced audio, enhanced video, augmented reality effects, and/or other enhancements). In some embodiments, for instance, the application processing pipeline 232 may take the form of SFU processing pipeline 332, MCU processing pipeline 432, or vision AI processing pipeline 532, illustrated in FIGS. 3-5 and described in further detail below. The processed media streams generated by application processing pipeline 232 may be provided as an input to encode output stream(s) stage 240 along with instructions for encoding one or more output media streams therefrom.

At encode output stream(s) stage 240, encoding assignment 244 may receive processed media streams along with instructions for encoding one or more output media streams therefrom, including a number and type of output media streams as well as specific encoding parameters to be used when encoding each output media stream (e.g., codec types and codec profiles or options, and/or other media stream parameters to be used). Encoding assignment 244 may also accept performance capabilities 206 as an input as well as inputs from performance state 242 and application state 223.

In some embodiments, for example, performance capabilities 206 of the system or device on which hardware encoding engine 246 and/or software decoding engine 248 may operate (for convenience, "encoding system") may be retrieved from a memory or storage device (e.g., from memor(ies) 134 or storage device(s) 136 of application server 130). Performance capabilities 206, for example, may indicate hardware processing support provided by the encoding system, including for example, the types of media, types of processing, types of codecs, codec profiles, features or options, and other media stream parameters that may be supported in hardware (e.g., by processor(s) 132 of application server 130). In some embodiments, where hardware encoding/decoding engines 246, 227 and software encoding/decoding engines 248, 229 operate on the same system or device, performance capabilities 204 and performance capabilities 206 may be the same or may include at least some common information.

In some embodiments, performance state 242 may operate to determine one or more performance state parameters of the encoding system. In some embodiments, for example, performance state 242 may measure or estimate one or more hardware utilization levels, temperature levels, power consumption levels, and/or other performance levels of the encoding system (as a whole and/or with respect to individual hardware components therein). In some embodiments, for instance, performance state 242 may obtain performance levels by requesting or reading the values from a system, device, or component management interface (e.g., a CPU or GPU management interface) and/or computing the performance levels therefrom. In some cases, performance state 242 may determine an instantaneous performance level (e.g., an instantaneous temperature), while in others, it may determine an average performance level over a period of time (e.g., an average processor utilization level over the past 5 seconds). In some embodiments, where hardware encoding/decoding engines 246, 227 and software encoding/decoding engines 248, 229 operate on the same system or device, performance state 222 and performance state 242 may be included or otherwise combined together.

In some embodiments, application state 243 may operate to determine one or more application state parameters regarding the application session (or application sessions) being supported by the decoding system. In some embodiments, for example and without limitation, application state 243 may determine parameters regarding the application session associated with the output media stream being encoded along with parameters regarding other application sessions being supported by the encoding system. As an illustrative example, with regard to a conferencing platform used to conduct one or more communication sessions, applications state 223 may determine a type of each communication session and a role of the encoding system therein (e.g., whether a communication session is a P2P communication session, SFU session, MCU session, etc.) and/or different parameters of each communication session (e.g., a number of conference participants, a geographic location of each participant, a connection quality of each participant and/or network demands of the communication session, etc.). In some embodiments, where hardware encoding/decoding engines 246, 227 and software encoding/decoding engines 248, 229 operate on the same system or device, application state 242 and application state 243 may be included or otherwise combined together.

Encoding assignment 244 may operate to assign encoding of each output media stream to either hardware encoding engine 246 or software encoding engine 248, which may be used to encode processed media streams to generate output media streams. Hardware encoding engine 246 and software encoding engine 248 may encode processed media streams using hardware and software capabilities, respectively, of the encoding system. In some embodiments, for example, instructions for generating output media streams (and processed media streams associated therewith) may be placed into a queue and encoding assignment 244 may determine an encoding assignment for each output media stream in serial fashion. In some embodiments, encoding assignment 244 may determine an optimal encoding assignment of an output media stream based on the media stream parameters provided in the instructions, as well as performance state parameters and performance capability parameters of the encoding system and application state parameters provided by performance state 242, performance capabilities 206, and application state 243, respectively.

In some embodiments, for example, encoding assignment 244 may preferentially assign encoding of an output media stream to hardware encoding engine 246, unless one or more performance state parameters indicate that an overload condition would result and/or a comparison of performance capabilities 206 and the media stream parameters provided in the instructions indicate that hardware encoding of the output media stream is not supported, in which case encoding assignment 244 may assign the output media stream to software encoding engine 248.

In some embodiments, encoding assignment 244 may consider existing processing assignments in assessing the optimality of an encoding assignment and may dynamically reassign processing of media streams in order to achieve an optimal processing assignment. For example, if encoding assignment 244 determines that assigning encoding of an output media stream to hardware encoding engine 246 would result in an overload condition, it may analyze existing processing assignments (e.g., existing encoding assignments, decoding assignments, or both) to determine whether reassigning processing of one or more media streams to software encoding engine 248 would permit assignment of the output media stream to hardware encoding engine 246 (e.g., without resulting in an overload condition) while improving an overall processing optimality. In some embodiments, where hardware encoding/decoding engines 246, 227 and software encoding/decoding engines 248, 229 operate on the same system or device, encoding assignment 244 may also consider whether reassigning encoding one of one or more output media streams (e.g., from hardware encoding engine 246 to software encoding engine 248) would permit assignment of the input media stream to hardware decoding engine 227 and improve an overall processing optimality. By way of example, encoding assignment 244 may improve overall throughput, processing efficiency, and media quality by reassigning processing of low-resolution media streams from hardware encoding/decoding engines 246, 227 to software encoding/decoding engines 248, 229 and assigning encoding of a high-resolution output media stream to hardware encoding engine 246. The output media streams produced by hardware encoding engine 246 and/or software decoding engine 248 may be provided as inputs to transmit output stream(s) stage 250.

At transmit output stream(s) stage 250, one or more output streams 208a-208n may be sent (e.g., by application server agent 142 of application server 130 to endpoints 110) as part of an application session (or multiple application sessions). In some embodiments, output streams 208a-208n may include one or more media streams, which may contain audio, video, and/or other data for an application session. In some cases, the output streams 208a-208n may also include one or more control streams (e.g., associated with an application session as a whole and/or individual media streams provided as part thereof).

Figure 3:
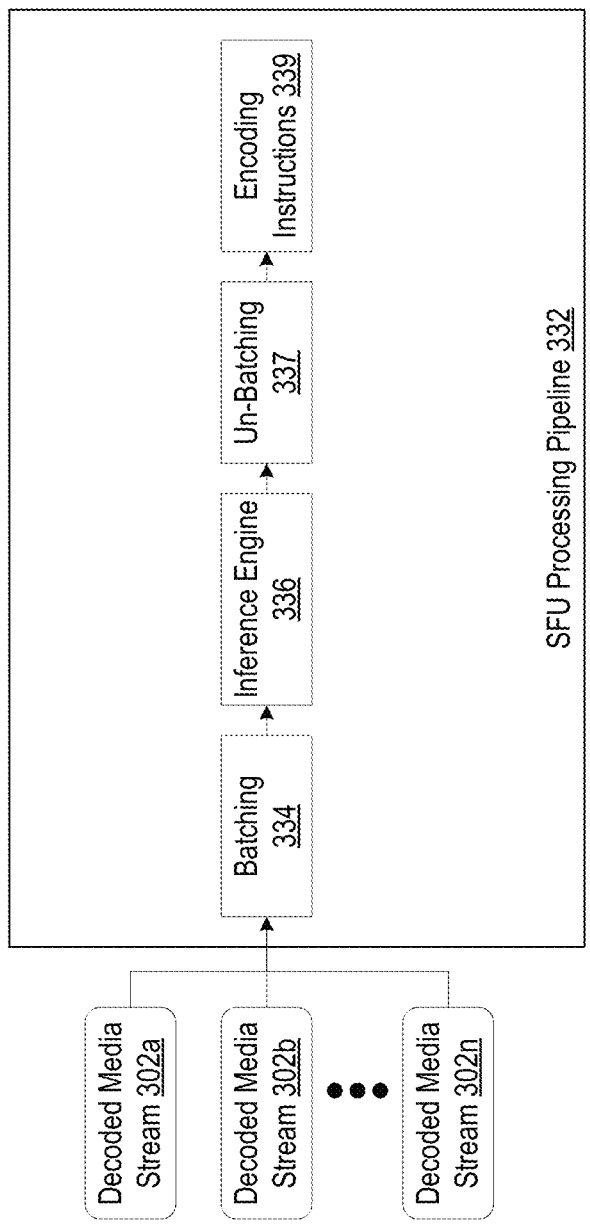
FIG. 3 illustrates a block diagram of an example selective forwarding unit (SFU) processing pipeline for a conferencing platform, according to at least one embodiment.

FIG. 3 illustrates a block diagram of an example selective forwarding unit (SFU) processing pipeline 332 for a conferencing platform, according to at least one embodiment. In some embodiments, for example, SFU processing pipeline 332 may serve as application processing pipeline 232 in the media stream processing pipeline 200 of FIG. 2.

As illustrated in FIG. 3, stream SFU processing pipeline 332 may receive decoded media streams 302a-302n (e.g., decoded input media streams received from one or more conference participants as part of a communication session facilitated by a conferencing platform). By way of example, where the conferencing platform operates as an SFU in facilitating a communication session between n conference participants, each participant may provide an input stream that may be decoded (e.g., as part of decode input stream(s) stage 220 in media stream processing pipeline 200) and provided to SFU processing pipeline 332 as decoded media streams 302a-302n. Illustratively, SFU processing pipeline 332 in facilitating a communication session between three conference participants may receive three decoded video streams for processing (e.g., one decoded video stream for each participant).

Decoded media streams 302a-302n may be passed to batching 334 that may process the decoded media streams and generate batches of media samples therefrom for processing. In some embodiments, for example, decoded media streams 302a-302n may include a series of frames that batching 334 may assemble into groups of a particular size (e.g., 24 audio frames/batch, 16 high-resolution video frames/batch, etc.) for processing by inference engine 336. In some embodiments, batching 334 may determine an optimal batch size (e.g., optimized for processing by inference engine 336) based on one or more constraints (e.g., a desired throughput, processing latency, memory footprint, etc.). In some embodiments, for instance, batching 334 may determine an optimal batch size based on type of GPU or processor on which inferencing engine 336 may operate (e.g., types of processor(s) 132 of application server 130) as well as a number of concurrent pipeline instances being supported by inference engine 336 (e.g., a number of concurrent communication sessions being facilitated by the conferencing platform). For instance, continuing with the previous example, the decoded video streams for each of the three conference participants may be batched together (e.g., with frames of each decoded media stream being assembled into a batch) for processing. In some cases, media streams from other communication sessions may also be batched together to improve performance (e.g., media streams from concurrent communication sessions that are to undergo similar processing by inference engine 336).

Inference engine 336 may receive batches of media samples assembled by batching 334 and process them through one or more inference models (e.g., AI or machine learning models) to generate enhanced versions thereof (e.g., enhance the media samples assembled therein) or derive other information therefrom. In some embodiments, for example, inferencing engine 336 may process the batches through one or more AI or machine learning models to provide enhanced audio (e.g., improved audio resolution, echo cancellation, noise removal, speaker focus, etc.), enhanced video (e.g., improved video resolution, detail enhancement, artifact reduction, video noise removal, virtual background (or AI green screen), etc.), augmented reality effects (e.g., face tracking, facial expression estimation, body pose estimation, eye contact simulation, avatar simulation, etc.), and/or other enhancements (e.g., real-time translation, speech-to-text\text-to-speech conversion, etc.).

The processed batches may be provided to un-batching 337 and then to encoding instructions 339, which may re-assemble the media samples in the processed batches into processed media streams and generate instructions for encoding one or more output streams therefrom. In some embodiments, for example, where inference engine 336 operates to enhance the media samples in each batch, un-batching 337 may re-assemble the processed batches into enhanced media streams and encoding instructions 339 may generate instructions for encoding output streams therefrom. For instance, continuing with the earlier example, un-batching 337 and encoding instructions 339 may re-assemble the processed batches into enhanced media streams for each of the n conference participants and may generate instructions to encode n−1 output media streams for each conference participant (e.g., to encode the enhanced media stream of each of the other n−1 participants). Illustratively, where a communication session includes three conference participants, un-batching 337 and encoding instructions 339 may re-assemble three enhanced video streams and generate instructions for encoding six output streams therefrom (e.g., to encode enhanced streams 1 and 2 for participant 3, enhanced streams 2 and 3 for participant 1, and enhanced streams 1 and 3 for participant 2). The instructions, for instance, may identify a type of output stream that is to be encoded along with specific encoding parameters that are to be used (e.g., identifying a codec type and codec profiles or options to be used, as well as a resolution, frame rate, bit rate, color space and depth, and/or other media stream parameters to be used). The enhanced media streams and encoding instructions may be further processed to generate and transmit output streams to each conference participant (e.g., as part of encode output stream(s) stage 240 and transmit output stream(s) stage 250 in media stream processing pipeline 200).

Figure 4:
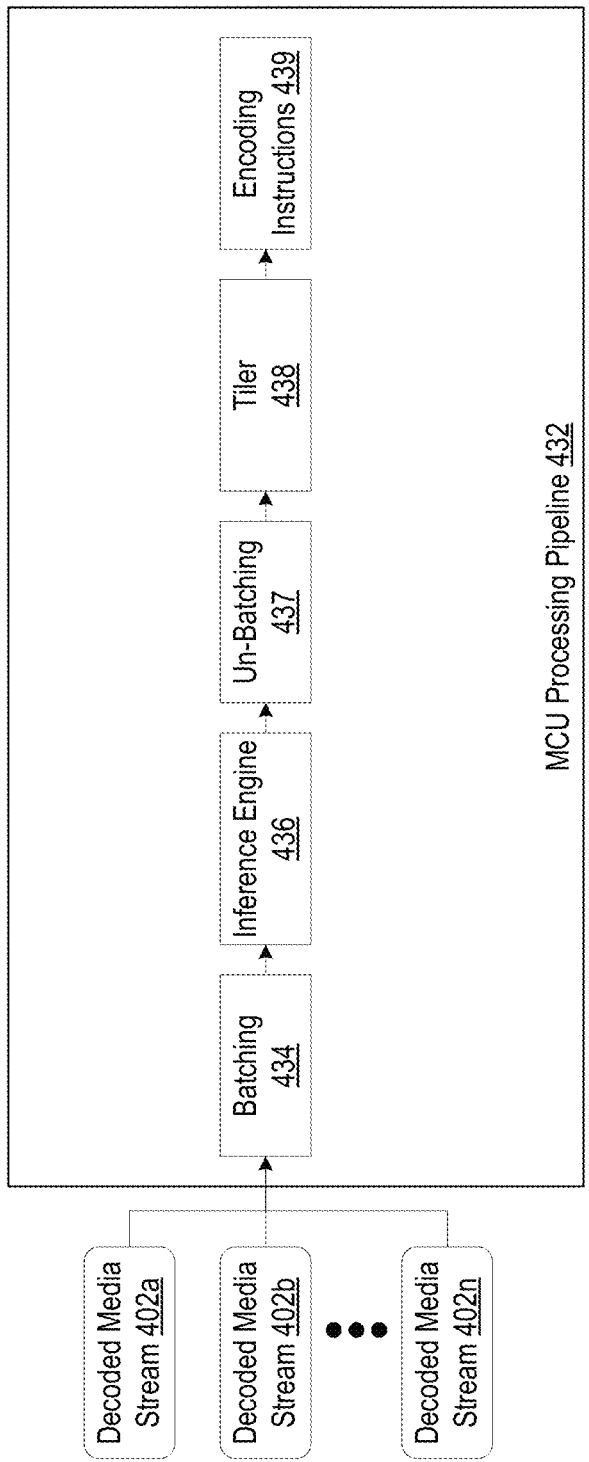
FIG. 4 illustrates a block diagram of an example multipoint control unit (MCU) processing pipeline for a conferencing platform, according to at least one embodiment.

FIG. 4 illustrates a block diagram of an example multipoint control unit (MCU) processing pipeline 432 for a conferencing platform, according to at least one embodiment. In some embodiments, for example, MCU processing pipeline 432 may serve as application processing pipeline 232 in the media stream processing pipeline 200 of FIG. 2.

As illustrated in FIG. 4, stream MCU processing pipeline 432 may receive decoded media streams 402a-402n (e.g., decoded input media streams received from one or more conference participants as part of a communication session facilitated by a conferencing platform). By way of example, where the conferencing platform operates as an MCU in facilitating a communication session between n conference participants, each participant may provide an input stream that may be decoded (e.g., as part of decode input stream(s) stage 220 in media stream processing pipeline 200) and provided to MCU processing pipeline 432 as decoded media streams 402a-402n. Illustratively, MCU processing pipeline 432 in facilitating a communication session between three conference participants may receive three decoded video streams for processing (e.g., one decoded video stream for each participant).

Decoded media streams 402a-402n may be passed to batching 434 that may process the decoded media streams and generate batches of media samples therefrom for processing. In some embodiments, for example, decoded media streams 402a-402n may include a series of frames that batching 434 may assemble into groups of a particular size (e.g., 24 audio frames/batch, 16 high-resolution video frames/batch, etc.) for processing by inference engine 436. In some embodiments, batching 434 may determine an optimal batch size (e.g., optimized for processing by inference engine 436) based on one or more constraints (e.g., a desired throughput, processing latency, memory footprint, etc.). In some embodiments, for instance, batching 434 may determine an optimal batch size based on type of GPU or processor on which inferencing engine 436 may operate (e.g., types of processor(s) 132 of application server 130) as well as a number of concurrent pipeline instances being supported by inference engine 436 (e.g., a number of concurrent communication sessions being facilitated by the conferencing platform). For instance, continuing with the previous example, the decoded video streams for each of the three conference participants may be batched together (e.g., with frames of each decoded media stream being assembled into a batch) for processing. In some cases, media streams from other communication sessions may also be batched together to improve performance (e.g., media streams from concurrent communication sessions that are to undergo similar processing by inference engine 436).

Inference engine 436 may receive batches of media samples assembled by batching 434 and process them through one or more inference models (e.g., AI or machine learning models) to generate enhanced versions thereof (e.g., enhance the media samples assembled therein) or derive other information therefrom. In some embodiments, for example, inferencing engine 436 may process the batches through one or more AI or machine learning models to provide enhanced audio (e.g., improved audio resolution, echo cancellation, noise removal, speaker focus, etc.), enhanced video (e.g., improved video resolution, detail enhancement, artifact reduction, video noise removal, virtual background (or AI green screen), etc.), augmented reality effects (e.g., face tracking, facial expression estimation, body pose estimation, eye contact simulation, avatar simulation, etc.), and/or other enhancements (e.g., real-time translation, speech-to-text\text-to-speech conversion, etc.).

The processed batches may be provided to un-batching 437, which may re-assemble the media samples in the processed batches into processed media streams. The processed media streams may be provided to tiler 438, which may arrange the media streams in a desired layout and generate a composite media stream therefrom. In some embodiments, for example, where inference engine 436 operates to enhance the media samples in each batch, un-batching 437 may re-assemble the processed batches into enhanced media streams. The enhanced media streams may be provided to tiler 438, which may arrange the enhanced media streams in a desired output layout (or tiled layout) and output a composite media stream. An output layout, for example, may call for the stream of a first participant to be resized and placed in a large main window, while the other conference participants are resized and placed in adjacent thumbnail windows. For instance, continuing with the earlier example, where a communication session includes n conference participants, un-batching 437 may re-assemble the processed batches into n enhanced media streams. Tiler 438 may arrange the enhanced media streams in the output layout desired by each conference participant (e.g., arranging the enhanced media streams of the other n−1 conference participants in a desired layout) and generate n composite media streams therefrom. Illustratively, where a communication session includes three conference participants, un-batching 437 may re-assemble three enhanced video streams, which tiler 438 may use to generate three composite video streams therefrom (e.g., arranging enhanced streams 1 and 2 in a first layout for participant 3, enhanced streams 2 and 3 in a second layout for participant 1, and enhanced streams 1 and 3 in a third layout for participant 2).

The composite media streams generated by tiler 438 may be provided to encoding instructions 439, which may generate instructions for encoding output streams therefrom. Encoding instructions 439, for example, may generate instructions to encode a composite video stream for each conference participant (e.g., generating instructions to encode n output media streams). The instructions, for instance, may identify a type of output stream that is to be encoded along with specific encoding parameters that are to be used (e.g., identifying a codec type and codec profiles or options to be used, as well as a resolution, frame rate, bit rate, color space and depth, and/or other media stream parameters to be used). The composite media streams and encoding instructions may be further processed to generate and transmit output streams to each conference participant (e.g., as part of an encode output stream(s) stage 240 and transmit output stream(s) stage 250 in media stream processing pipeline 200).

Figure 5:
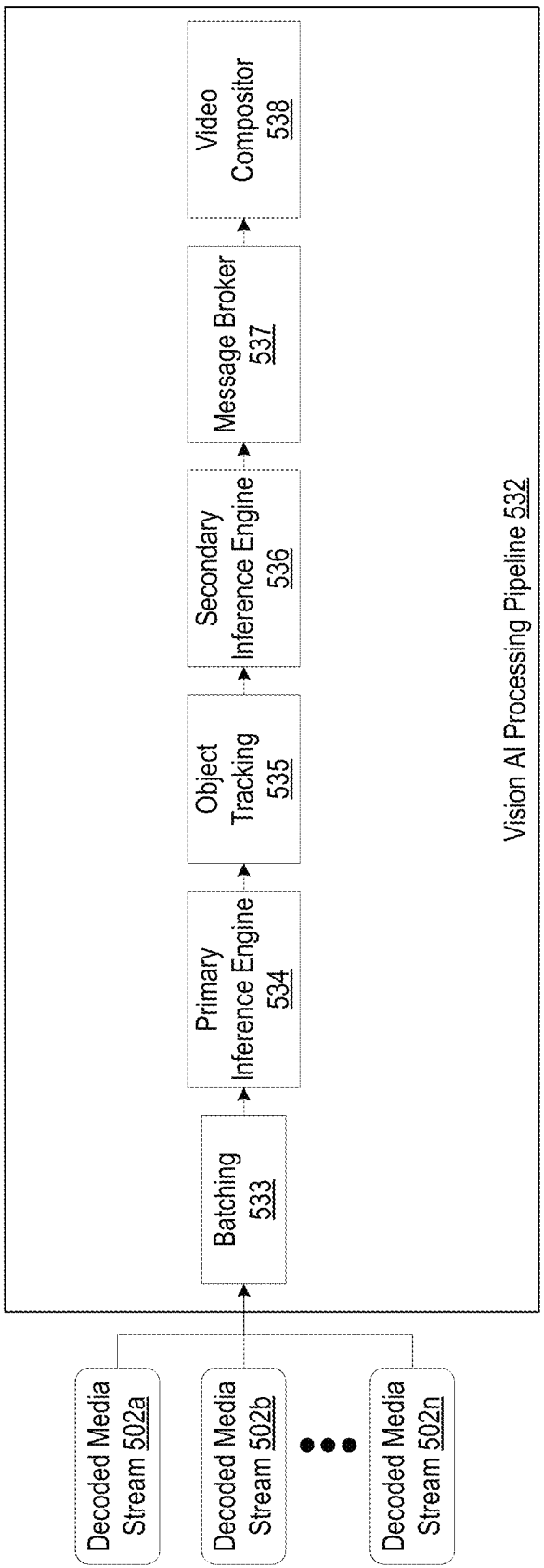
FIG. 5 illustrates a block diagram of an example computer vision processing pipeline for an artificial intelligence (AI) enabled computer vision platform, according to at least one embodiment.

FIG. 5 illustrates a block diagram of an example computer vision processing pipeline 532 for an artificial intelligence (AI) enabled computer vision platform, according to at least one embodiment. In some embodiments, for example, computer vision processing pipeline 532 may serve as application processing pipeline 232 in the media stream processing pipeline 200 of FIG. 2.

As illustrated in FIG. 5, stream computer vision processing pipeline 532 may receive decoded media streams 502*a*-502*n* (e.g., decoded input media streams received from one or more endpoints 110 for an application session supported by the vision AI platform). By way of example, computer vision processing pipeline 532 may support a traffic monitoring platform, which may receive and processing video streams from a network of traffic cameras (e.g., to detect traffic congestion, traffic violations, traffic accidents, and/or other traffic monitoring tasks).

Decoded media streams 502*a*-502*n* may be passed to batching 533 that may process the decoded media streams and generate batches of media samples therefrom for processing. In some embodiments, for example, decoded media streams 502*a*-502*n* may include a series of frames that batching 533 may assemble into groups of a particular size (e.g., 24 audio frames/batch, 16 high-resolution video frames/batch, etc.) for processing. In some embodiments, batching 533 may determine an optimal batch size (e.g., optimized for processing by primary inference engine 534) based on one or more constraints (e.g., a desired throughput, processing latency, memory footprint, etc.). In some embodiments, for instance, batching 533 may determine an optimal batch size based on type of GPU or processor on which an inferencing engine may operate (e.g., types of processor(s) 132 of application server 130) as well as a number of concurrent pipeline instances being supported by the inference engine (e.g., a number of concurrent traffic monitoring sessions). In some cases, media streams from other application sessions may also be batched together to improve performance (e.g., media streams from concurrent traffic monitoring sessions that are to undergo similar processing).

Primary inference engine 534 may receive batches of media samples assembled by batching 533 and process them through one or more primary inference models (e.g., AI or machine learning models) to perform one or more computer vision tasks. In some embodiments, for example, video frames may be processed through one or more influence models to detect, segment, and/or classify objects therewithin. By way of example, where computer vision processing pipeline 532 supports a traffic monitoring platform, primary inference engine 534 may process video frames (e.g., from video streams from a network of traffic cameras) to identify vehicles therein. The output of primary inference engine 534 may be provided to one or more additional stages for further processing. In some embodiments, for example, the output of primary inference engine 534 may be provided to object tracking 535, which may operate to track one or more objects identified by primary inference engine 534. Continuing with the previous example, for instance, object tracking 535 may operate to track vehicles identified by primary inference engine 534 (e.g., between video frames from a particular traffic camera and/or across multiple traffic cameras).

Secondary inference engine 536 may process the output of batching 533, primary inference engine 534, and/or object tracking 535 through one or more secondary inference models (e.g., AI or machine learning models) to perform one or more additional computer vision tasks. In some embodiments, for example, secondary inference engine 536 may operate to identify specific attributes regarding the objects detected by primary inference engine 534 and tracked in object tracking 535. For instance, secondary inference engine 536 may operate to identify a make, model, and/or manufacturer of a vehicle or a license plate number of a vehicle identified by primary inference engine 534 (and tracked by object tracking 535).

In some embodiments, the output generated by secondary inference engine 536 may be provided to message broker 537, which may interface with an external entity, for example, to report the results and/or obtain additional information related thereto. Message broker 537, for example, may contact a service provided by law enforcement or a government agency to request more information about or report an incident involving a particular vehicle identified by secondary inference engine 536 (e.g., based on a determined make, model, and/or manufacturer or license plate number of a vehicle). As another example, message broker 537 may provide the results to a remote server to perform further analytics thereon.

Video compositor 538 may be used to visualize the output of batching 533, primary inference engine 534, object tracking 535, secondary inference engine 536, and/or message broker 537. By way of example, video compositor 538 may arrange decoded media streams in a dashboard (e.g., with the video stream of a main traffic camera place in a large main window, and other traffic cameras being placed in adjacent thumbnail windows) along with the results of primary inference engine 534, object tracking 535, secondary inference engine 536, and/or message broker 537 (e.g., as an overlay to the main window). In some embodiments, video compositor 538 may also generate instruction for encoding the dashboard as an output media stream which may be transmitted to a remote terminal for viewing (e.g., as part of an encode output stream(s) stage 240 and transmit output stream(s) stage 250 in media stream processing pipeline 200).

Figure 6:
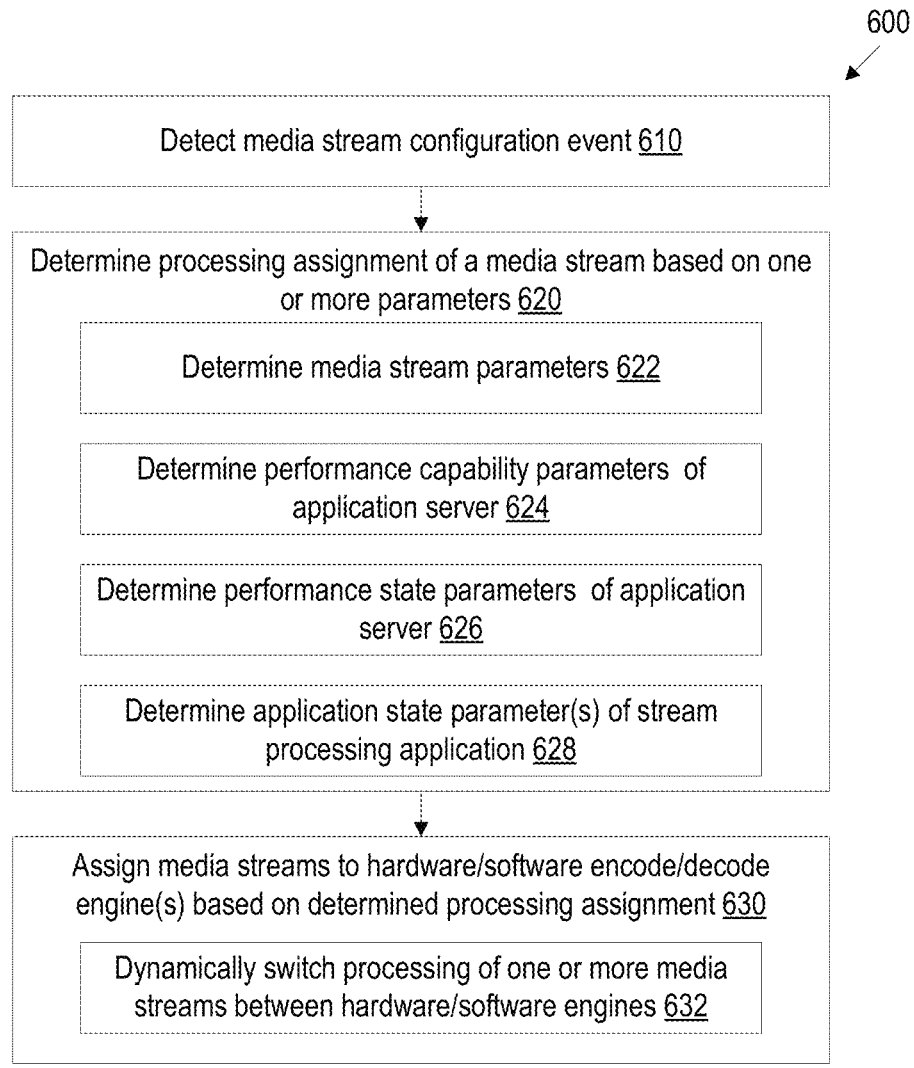
FIG. 6 illustrates a flow diagram of an example method for processing media streams, according to at least one embodiment.

FIG. 6 illustrates a flow diagram of an example method 600 for processing media streams, according to at least one embodiment. For the sake of simplicity and clarity, the method is depicted and described as a series of operations. However, in accordance with the present disclosure, such operations may be performed in other orders and/or concurrently, and with other operations not presented or described herein. Furthermore, not all illustrated operations may be required in implementing a method in accordance with the present disclosure. Those of skill in the art will also understand and appreciate that the method could be represented as a series of interrelated states or events via a state diagram. Additionally, it will be appreciated that the disclosed method is capable of being stored on an article of manufacture. The term "article of manufacture," as used herein, is intended to encompass a computer-readable device or storage media provided with a computer program and/or executable instructions that, when executed, affect one or more operations. The method 600 may be performed by processing logic of a computing device (e.g., using processor(s) 132 of application server 130 shown in FIG. 1). In method 200, an object detection and segmentation process may be performed in which a source image is iteratively processed to identify one or more objects of interest in the source image. In some embodiments, for example, an image may be iteratively processed to detect a portion of one or more objects in each iteration. The results of each iteration may be combined and then segmented into groups of elements that correspond to one or more objects in the source image. One or more groups of elements may be selected from the segmented results, which may correspond to particular objects of interest, to produce a final object identification.

At operation 610, processing logic may be used to detect a media stream configuration event. In some embodiments, for example, processing logic may detect a change in a number of media streams being processed (e.g., upon receipt of an additional media stream for processing or removal of a media stream from processing), a change in the media stream parameters of one or more media streams being processed (e.g., a change in a format of an input media stream or desired output media stream), and/or a change in a performance state of an application server (e.g., as a whole and/or with respect to individual hardware components therein). For example, in embodiments where the application server hosts a conferencing platform, processing logic may determine when a new participant joins a communication session, when a new communication session is initiated, when a participant ends a communication session, or when a participant changes a mode of communication (e.g., a change in the desired format of media streams being sent and received).

As another example, processing logic may monitor a performance state of the application server and determine when certain conditions are met. In some embodiments, for example, processing logic may determine when a performance state of the application server indicates that one or more quality-of-service (QOS) factors (e.g., a frame drop rate, a processing latency, an encoding bitrate, etc.) is not being met (or is not likely to be met). In some embodiments, for example, processing logic may be used to monitor performance levels (e.g., hardware utilization levels, temperature levels, power consumption levels, etc.) of different application server components and determine when certain threshold criteria are met (e.g., indicating an overload condition). In some embodiments, processing logic may obtain the performance levels by requesting or reading the values from a system, device, or component management interface (e.g., a CPU or GPU management interface) and/or computing the performance levels therefrom. By way of example, performance logic may determine when a utilization level (e.g., of a GPU processor) exceeds are particular threshold (e.g., above 90% utilization) and/or remains above a particular threshold level for an extended period of time (e.g., where an average utilization rate across a 15 second window is above 80%).

At operation 620, in response to detecting a media stream configuration event, processing logic may determine a processing assignment of a media stream. In some embodiments, for example, processing logic may determine a processing assignment (e.g., for decoding an input media stream or encoding an output media stream) based on one or more parameters.

At block 622, for example, processing logic may determine one or more media stream parameters. In some embodiments, for example, processing logic may analyze an input media stream to determine a type of the media stream along with different media stream parameters. Processing logic, for instance, may determine a format of each media stream (e.g., a codec type and codec profiles, features, or options used to encode the media stream) and other media stream parameters (e.g., a resolution, frame rate, color space and depth, etc.). Processing logic may determine media stream parameters based on an analysis of the media stream itself (e.g., based on metadata information provided as part of the media stream) and/or control streams associated with the media stream or application session. Processing logic, likewise, may determine media stream parameters for an output media stream based on instructions for encoding the media stream, which may include specific encoding parameters to be used (e.g., codec types and codec profiles or options, and/or other media stream parameters to be used).

At block 624, processing logic may determine one or more performance capability parameters of the application server. In some embodiments, for example, processing logic may retrieve the performance capabilities of application server (e.g., from a configuration file) from a memory or storage device. The performance capabilities, for example, may indicate hardware processing support provided by the application server, including for example, the types of media, types of processing, types of codecs, codec profiles, features or options, and other media stream parameters that may be supported in hardware.

At block 626, processing logic may determine one or more performance state parameters of application server. In some embodiments, for example, processing logic may measure or estimate one or more hardware utilization levels, temperature levels, power consumption levels, and/or other performance levels of the application server (as a whole and/or with respect to individual hardware components therein). In some embodiments, for instance, processing logic may obtain performance levels by requesting or reading the values from a system, device, or component management interface (e.g., a CPU or GPU management interface) and/or computing the performance levels therefrom. In some cases, processing logic may determine an instantaneous performance level (e.g., an instantaneous temperature), while in others, it may determine an average performance level over a period of time (e.g., an average processor utilization level over the past 5 seconds).

At block 628, processing logic may determine one or more application state parameters regarding the application session with which the media stream is associated (and/or other application sessions being supported by the application server). As an illustrative example, with regard to a conferencing platform used to conduct one or more communication sessions, processing logic may determine a type of each communication session and a role of the application server therein and/or different parameters of each communication session (e.g., a number of conference participants, a geographic location of each participant, a connection quality of each participant and/or network demands of the communication session, etc.).

In some embodiments, processing logic may determine an optimal processing assignment for a media stream. In some embodiments, for example, processing logic may preferentially assign processing of a media stream to hardware encoding/decoding engines, unless one or more performance state parameters (e.g., hardware utilization levels, temperature levels, power consumption levels, etc.) indicate an overload condition (e.g., indicating that the hardware codecs of processors are overloaded or will become overloaded upon assignment of the media stream), in which case processing of the media stream may be assigned to software encoding/decoding engines. As another example, stream processing manager 144 may compare the performance capability parameters of an application server (e.g., hardware codec capabilities of different processors thereof) with media stream parameters of the media stream being assigned to determine whether hardware processing of the media stream is supported. If hardware processing is supported, processing logic may preferentially assign processing of the media stream to hardware encoding/decoding engines (e.g., unless the performance state parameters indicate an overload condition); and if not supported, processing logic may assign processing of the media stream to software encoding/decoding engines.

In some embodiments, processing logic may consider existing processing assignments in assessing the optimality of a processing assignment and may determine to dynamically reassign processing of media streams in order to achieve an optimal processing assignment. As an illustrative example, in determining a processing assignment of a media stream, processing logic may look to preferentially assign processing of the media stream to hardware encoding/decoding engines but may determine that an overload condition would result (e.g., based on an analysis of one or more performance state parameters). Processing logic may consider whether reassigning processing of one or more existing media streams (e.g., low-resolution streams) to software encoding/decoding engines would permit assignment of the current media stream (e.g., a high-resolution stream) to hardware encoding/decoding engines (e.g., without resulting in an overload condition) while improving an overall processing optimality.

At operation 630, processing logic may affect the determined processing assignment (e.g., determined at operation 620), for example, assigning processing of the media stream to either a hardware or software encode/decode engine. In some cases, at block 632, processing logic may dynamically switch processing of one or more media streams between hardware/software engines.

Figure 7:
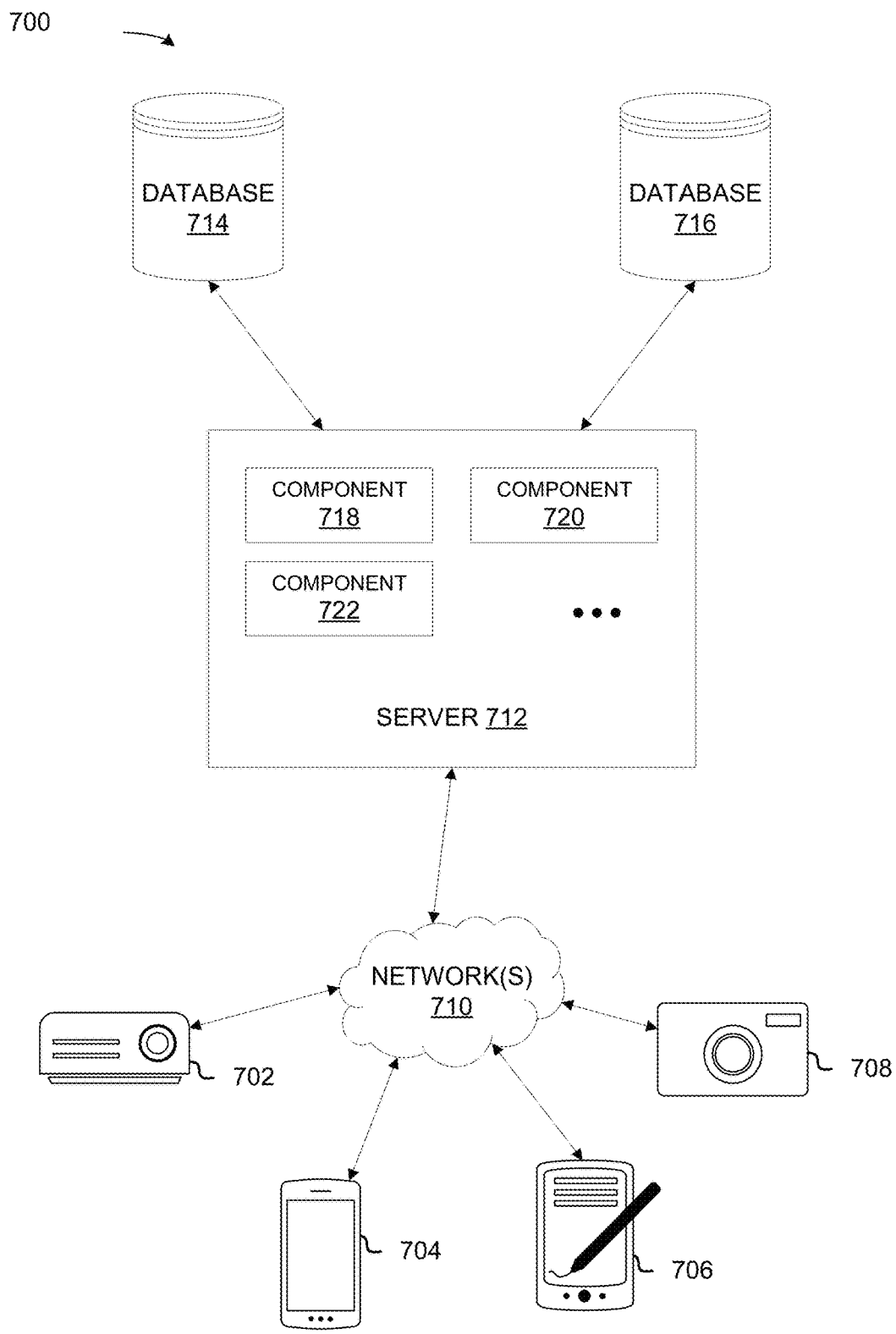
FIG. 7 illustrates a distributed system, in accordance with at least one embodiment.

FIG. 7 illustrates a distributed system 700, in accordance with at least one embodiment. In at least one embodiment, distributed system 700 includes one or more client computing devices 702, 704, 706, and 708, which are configured to execute and operate a client application such as a web browser, proprietary client, and/or variations thereof over one or more network(s) 710. In at least one embodiment, server 712 may be communicatively coupled with remote computing devices 702, 704, 706, and 708 via network 710.

In at least one embodiment, server 712 may be adapted to run one or more services or software applications such as services and applications that may manage session activity of single sign-on (SSO) access across multiple data centers. In at least one embodiment, server 712 may also provide other services or software applications can include non-virtual and virtual environments. In at least one embodiment, these services may be offered as web-based or cloud services or under a Software as a Service (SaaS) model to users of client computing devices 702, 704, 706, and/or 708. In at least one embodiment, users operating client computing devices 702, 704, 706, and/or 708 may in turn utilize one or more client applications to interact with server 712 to utilize services provided by these components.

In at least one embodiment, software components 718, 720 and 722 of distributed system 700 are implemented on server 712. In at least one embodiment, one or more components of distributed system 700 and/or services provided by these components may also be implemented by one or more of client computing devices 702, 704, 706, and/or 708. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 700. The embodiment shown in FIG. 7 is thus one example of a distributed system for implementing an embodiment system and is not intended to be limiting.

In at least one embodiment, client computing devices 702, 704, 706, and/or 708 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 710. Although distributed system 700 in FIG. 7 is shown with four client computing devices, any number of client computing devices may be supported. Other devices, such as devices with sensors, etc., may interact with server 712.

In at least one embodiment, network(s) 710 in distributed system 700 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 710 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 712 is a server for a data center that includes a plurality of nodes. In at least one embodiment, server 712 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 712 using software defined networking. In at least one embodiment, server 712 may be adapted to run one or more services or software applications.

In at least one embodiment, server 712 may run any operating system, as well as any commercially available server operating system. In at least one embodiment, server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, example database servers include without limitation those commercially available from Oracle, Microsoft, Sybase, IBM (International Business Machines), and/or variations thereof.

In at least one embodiment, server 712 may include one or more applications to analyze and consolidate data feeds and/or event updates received from users of client computing devices 702, 704, 706, and 708. In at least one embodiment, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and/or variations thereof. In at least one embodiment, server 712 may also include one or more applications to display data feeds and/or real-time events via one or more display devices of client computing devices 702, 704, 706, and 708.

In at least one embodiment, distributed system 700 may also include one or more databases 714 and 716 and/or nodes that provide storage, compute, networking and/or memory resources. In at least one embodiment, databases may provide a mechanism for storing information such as user interactions information, usage patterns information, adaptation rules information, and other information. In at least one embodiment, databases 714 and 716 may reside in a variety of locations. In at least one embodiment, one or more of databases 714 and 716 may reside on a non-transitory storage medium local to (and/or resident in) server 712. In at least one embodiment, databases 714 and 716 may be remote from server 712 and in communication with server 712 via a network-based or dedicated connection. In at least one embodiment, databases 714 and 716 may reside in a storage-area network (SAN). In at least one embodiment, any necessary files for performing functions attributed to server 712 may be stored locally on server 712 and/or remotely, as appropriate. In at least one embodiment, databases 714 and 716 may include relational databases, such as databases that are adapted to store, update, and retrieve data in response to SQL-formatted commands.

Figure 8:
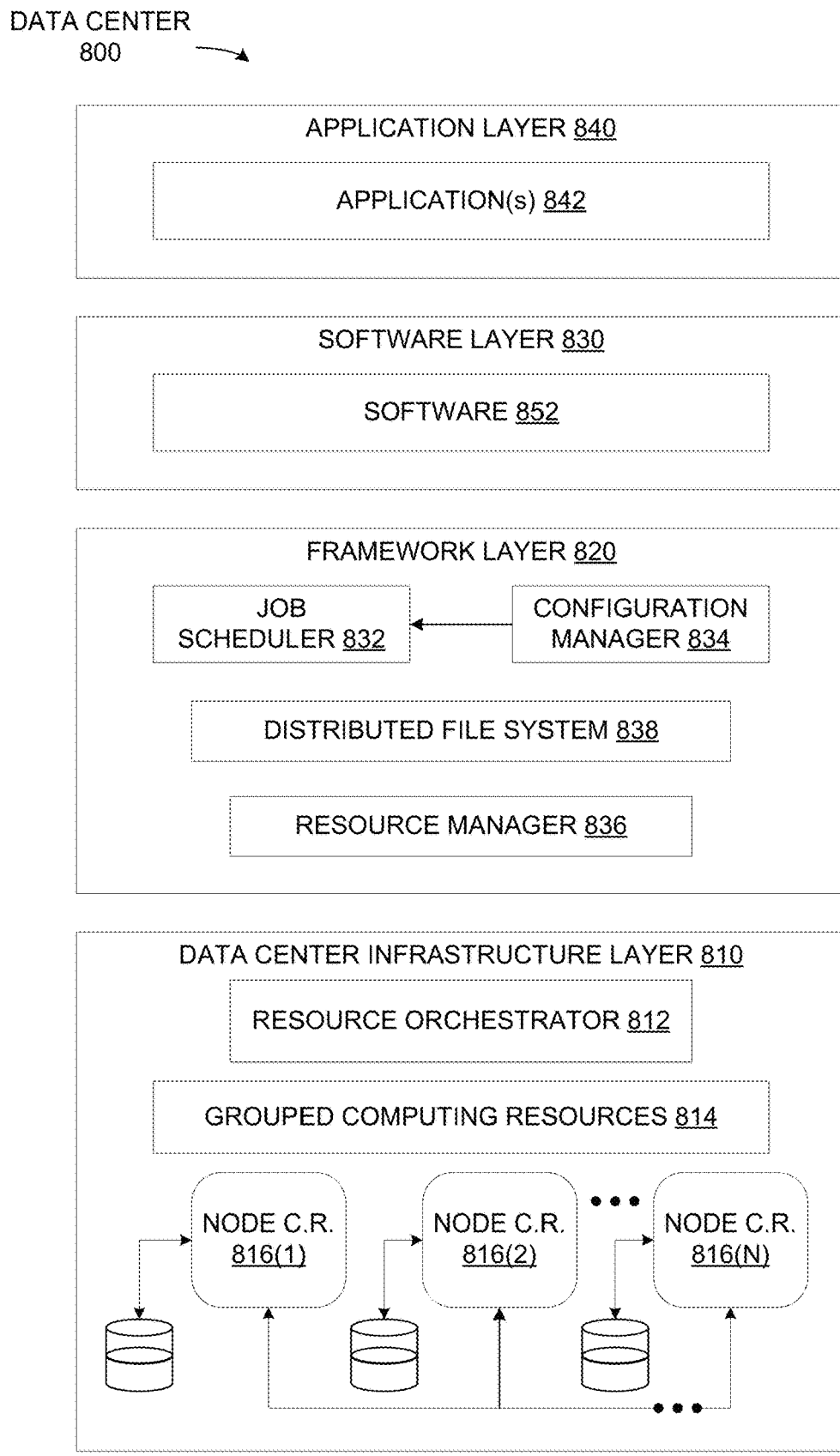
FIG. 8 illustrates an example data center, in accordance with at least one embodiment.

FIG. 8 illustrates an example data center 800, in accordance with at least one embodiment. In at least one embodiment, data center 800 includes, without limitation, a data center infrastructure layer 810, a framework layer 820, a software layer 830 and an application layer 840.

In at least one embodiment, as shown in FIG. 8, data center infrastructure layer 810 may include a resource orchestrator 812, grouped computing resources 814, and node computing resources ("node C.R.s") 816(1)-816(N) and/or other node resources, where "N" represents any whole, positive integer. In at least one embodiment, node C.R.s 816(1)-816(N) may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes, without limitation, a job scheduler 832, a configuration manager 834, a resource manager 836 and a distributed file system 838. In at least one embodiment, framework layer 820 may include a framework to support software 852 of software layer 830 and/or one or more application(s) 842 of application layer 840. In at least one embodiment, software 852 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 832 may include a Spark driver to facilitate scheduling of workloads supported by various layers of data center 800. In at least one embodiment, configuration manager 834 may be capable of configuring different layers such as software layer 830 and framework layer 820, including Spark and distributed file system 838 for supporting large-scale data processing. In at least one embodiment, resource manager 836 may be capable of managing clustered or grouped computing resources mapped to or allocated for support of distributed file system 838 and job scheduler 832. In at least one embodiment, clustered or grouped computing resources may include grouped computing resources 814 at data center infrastructure layer 810. In at least one embodiment, resource manager 836 may coordinate with resource orchestrator 812 to manage these mapped or allocated computing resources.

In at least one embodiment, software 852 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, machine learning software, image processing software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. In at least one or more types of applications may include, without limitation, CUDA applications, 5G network applications, artificial intelligence application, data center applications, and/or variations thereof.

In at least one embodiment, any of configuration manager 834, resource manager 836, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

Figure 9:
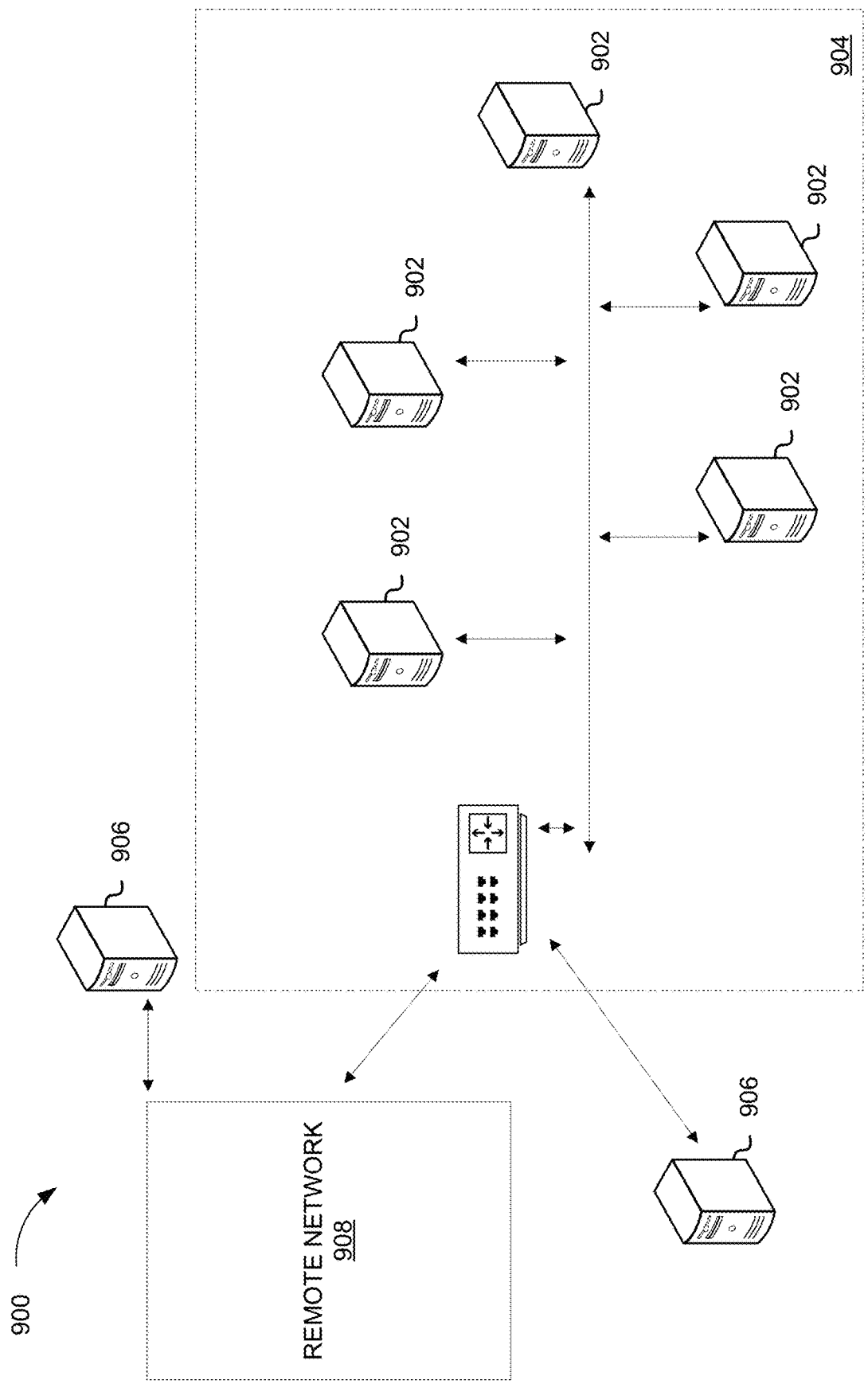
FIG. 9 illustrates a client-server network, in accordance with at least one embodiment.

FIG. 9 illustrates a client-server network 904 formed by a plurality of network server computers 902 which are interlinked, in accordance with at least one embodiment. In at least one embodiment, each network server computer 902 stores data accessible to other network server computers 902 and to client computers 906 and networks 908 which link into a wide area network that forms the client-server network 904. In at least one embodiment, configuration of a client-server network 904 may change over time as client computers 906 and one or more networks 908 connect and disconnect from a network 904, and as one or more trunk line server computers 902 are added or removed from a network 904. In at least one embodiment, when a client computer 906 and a network 908 are connected with network server computers 902, client-server network includes such client computers 906 and network 908. In at least one embodiment, the term computer includes any device or machine capable of accepting data, applying prescribed processes to data, and supplying results of processes.

In at least one embodiment, client-server network 904 stores information which is accessible to network server computers 902, remote network 908 and client computers 906. In at least one embodiment, network server computers 902 are formed by main frame computers minicomputers, and/or microcomputers having one or more processors each.

In at least one embodiment, server computers 902 are linked together by wired and/or wireless transfer media, such as conductive wire, fiber optic cable, and/or microwave transmission media, satellite transmission media or other conductive, optic or electromagnetic wave transmission media. In at least one embodiment, client computers 906 access a network server computer 902 or computing device by a similar wired or a wireless transfer medium. In at least one embodiment, a client computer 906 or computing device may link into a client-server network 904 using a modem and a standard telephone communication network. In at least one embodiment, alternative carrier systems such as cable and satellite communication systems also may be used to link into client-server network 904. In at least one embodiment, other private or time-shared carrier systems may be used. In at least one embodiment, network 904 is a global information network, such as the Internet. In at least one embodiment, network is a private intranet using similar protocols as the Internet, but with added security measures and restricted access controls. In at least one embodiment, network 904 is a private, or semi-private network using proprietary communication protocols.

In at least one embodiment, client computer 906 is any end user computer, and may also be a mainframe computer, mini-computer or microcomputer having one or more microprocessors. In at least one embodiment, server computer 902 may at times function as a client computer accessing another server computer 902. In at least one embodiment, remote network 908 may be a local area network, a network added into a wide area network through an independent service provider (ISP) for the Internet, or another group of computers interconnected by wired or wireless transfer media having a configuration which is either fixed or changing over time. In at least one embodiment, client computers 906 may link into and access a network 904 independently or through a remote network 908.

Figure 10:
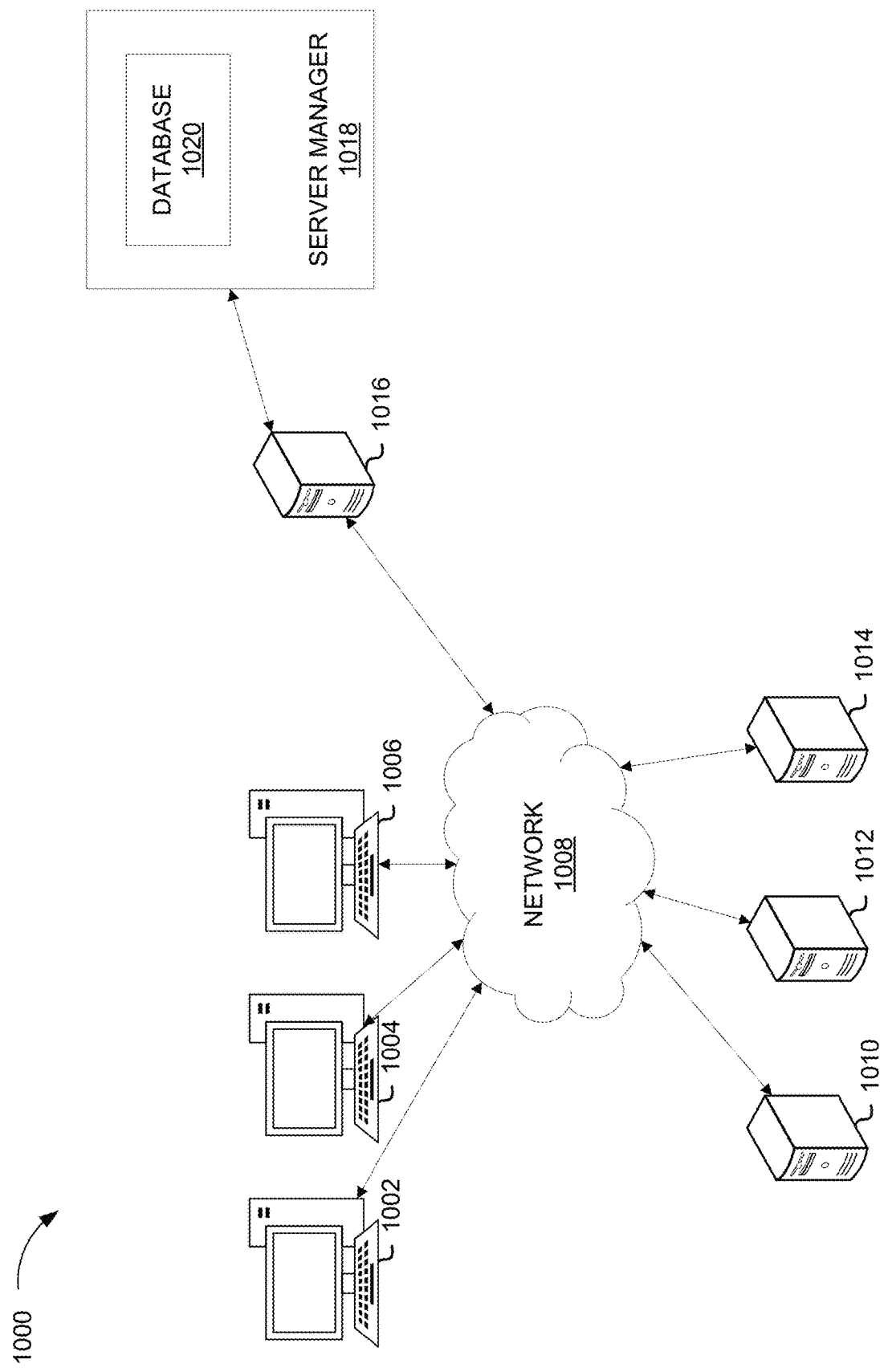
FIG. 10 illustrates a computer network, in accordance with at least one embodiment.

FIG. 10 illustrates a computer network 1008 connecting one or more computing machines or devices, in accordance with at least one embodiment. In at least one embodiment, network 1008 may be any type of electronically connected group of computers including, for instance, the following networks: Internet, Intranet, Local Area Networks (LAN), Wide Area Networks (WAN) or an interconnected combination of these network types. In at least one embodiment, connectivity within a network 1008 may be a remote modem, Ethernet (IEEE 802.3), Token Ring (IEEE 802.5), Fiber Distributed Datalink Interface (FDDI), Asynchronous Transfer Mode (ATM), InfiniBand™, or any other communication protocol. In at least one embodiment, computing devices linked to a network may be desktop, server, portable, handheld, set-top box, personal digital assistant (PDA), a terminal, or any other desired type or configuration. In at least one embodiment, depending on their functionality, network connected devices may vary widely in processing power, internal memory, and other performance aspects. In at least one embodiment, communications within a network and to or from computing devices connected to a network may be either wired or wireless. In at least one embodiment, network 1008 may include, at least in part, the world-wide public Internet which generally connects a plurality of users in accordance with a client-server model in accordance with a transmission control protocol/internet protocol (TCP/IP) specification. In at least one embodiment, client-server network is a dominant model for communicating between two computers. In at least one embodiment, a client computer ("client") issues one or more commands to a server computer ("server"). In at least one embodiment, a server fulfills client commands by accessing available network resources and returning information to a client pursuant to client commands. In at least one embodiment, client computer systems and network resources resident on network servers are assigned a network address for identification during communications between elements of a network. In at least one embodiment, communications from other network connected systems to servers will include a network address of a relevant server/network resource as part of communication so that an appropriate destination of a data/request is identified as a recipient. In at least one embodiment, when a network 1008 comprises the global Internet, a network address is an IP address in a TCP/IP format which may, at least in part, route data to an e-mail account, a website, or other Internet tool resident on a server. In at least one embodiment, information and services which are resident on network servers may be available to a web browser of a client computer through a domain name (e.g. www.site.com) which maps to an IP address of a network server.

In at least one embodiment, a plurality of clients 1002, 1004, and 1006 are connected to a network 1008 via respective communication links. In at least one embodiment, each of these clients may access a network 1008 via any desired form of communication, such as via a dial-up modem connection, cable link, a digital subscriber line (DSL), wireless or satellite link, or any other form of communication. In at least one embodiment, each client may communicate using any machine or computing device that is compatible with a network 1008, such as a personal computer (PC), work station, dedicated terminal, personal data assistant (PDA), or other similar equipment. In at least one embodiment, clients 1002, 1004, and 1006 may or may not be located in a same geographical area.

In at least one embodiment, a plurality of servers 1010, 1012, and 1014 are connected to a network 1008 to serve clients that are in communication with a network 1008. In at least one embodiment, each server is typically a powerful computer or device that manages network resources and responds to client commands. In at least one embodiment, servers include computer readable data storage media such as hard disk drives and RAM memory that store program instructions and data. In at least one embodiment, servers 1010, 1012, 1014 run application programs that respond to client commands. In at least one embodiment, server 1010 may run a web server application for responding to client requests for HTML pages and may also run a mail server application for receiving and routing electronic mail. In at least one embodiment, other application programs, such as an FTP server, a machine learning system including one or more machine learning models, or a media server for streaming audio/video data to clients may also be running on a server 1010. In at least one embodiment, different servers may be dedicated to performing different tasks. In at least one embodiment, server 1010 may be a dedicated web server that manages resources relating to web sites for various users, whereas a server 1012 may be dedicated to provide electronic mail (email) management. In at least one embodiment, other servers may be dedicated for media (audio, video, etc.), file transfer protocol (FTP), or a combination of any two or more services that are typically available or provided over a network. In at least one embodiment, each server may be in a location that is the same as or different from that of other servers. In at least one embodiment, there may be multiple servers that perform mirrored tasks for users, thereby relieving congestion or minimizing traffic directed to and from a single server. In at least one embodiment, servers 1010, 1012, 1014 are under control of a web hosting provider in a business of maintaining and delivering third party content over a network 1008.

In at least one embodiment, web hosting providers deliver services to two different types of clients. In at least one embodiment, one type, which may be referred to as a browser, requests content from servers 1010, 1012, 1014 such as web pages, email messages, video clips, etc. In at least one embodiment, a second type, which may be referred to as a user, hires a web hosting provider to maintain a network resource such as a web site, and to make it available to browsers. In at least one embodiment, users contract with a web hosting provider to make memory space, processor capacity, and communication bandwidth available for their desired network resource in accordance with an amount of server resources a user desires to utilize.

In at least one embodiment, in order for a web hosting provider to provide services for both of these clients, application programs which manage a network resources hosted by servers must be properly configured. In at least one embodiment, program configuration process involves defining a set of parameters which control, at least in part, an application program's response to browser requests and which also define, at least in part, a server resources available to a particular user.

In one embodiment, an intranet server 1016 is in communication with a network 1008 via a communication link. In at least one embodiment, intranet server 1016 is in communication with a server manager 1018. In at least one embodiment, server manager 1018 comprises a database of an application program configuration parameters which are being utilized in servers 1010, 1012, 1014. In at least one embodiment, users modify a database 1020 via an intranet server 1016, and a server manager 1018 interacts with servers 1010, 1012, 1014 to modify application program parameters so that they match a content of a database. In at least one embodiment, a user logs onto an intranet server 1016 by connecting to an intranet server 1016 via client 1002 (e.g., a client computing device) and entering authentication information, such as a username and password.

In at least one embodiment, when a user wishes to sign up for new service or modify an existing service, an intranet server 1016 authenticates a user and provides a user with an interactive screen display/control panel that allows a user to access configuration parameters for a particular application program. In at least one embodiment, a user is presented with a number of modifiable text boxes that describe aspects of a configuration of a user's web site or other network resource. In at least one embodiment, if a user desires to increase memory space reserved on a server for its web site, a user is provided with a field in which a user specifies a desired memory space. In at least one embodiment, in response to receiving this information, an intranet server 1016 updates a database 1020. In at least one embodiment, server manager 1018 forwards this information to an appropriate server, and a new parameter is used during application program operation. In at least one embodiment, an intranet server 1016 is configured to provide users with access to configuration parameters of hosted network resources (e.g., web pages, email, FTP sites, media sites, etc.), for which a user has contracted with a web hosting service provider.

Figure 11:
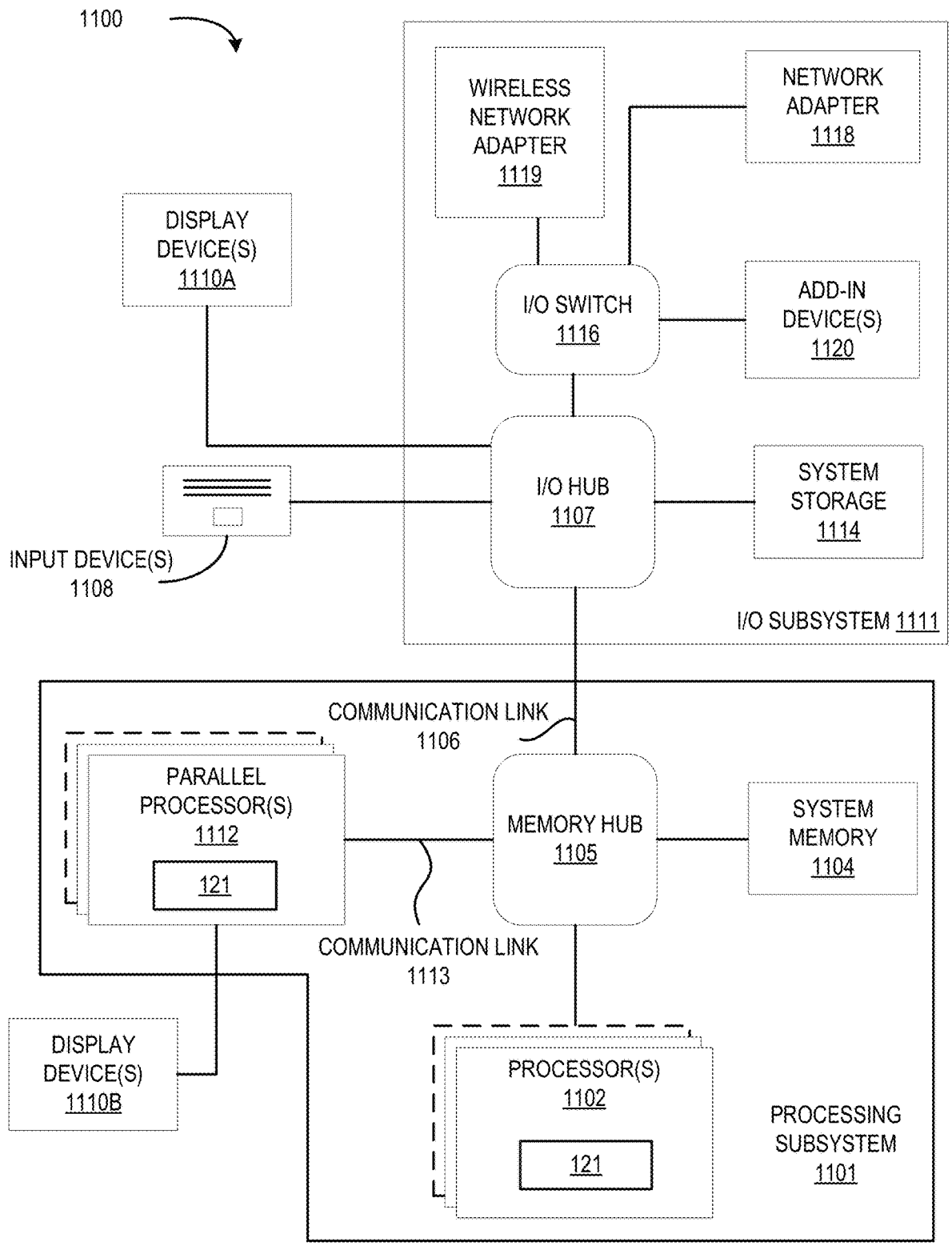
FIG. 11 is a block diagram illustrating a computer system, according to at least one embodiment.

FIG. 11 is a block diagram illustrating a computing system 1100 according to at least one embodiment. In at least one embodiment, computing system 1100 includes a processing subsystem 1101 having one or more processor(s) 1102 and a system memory 1108 communicating via an interconnection path that may include a memory hub 1105. In at least one embodiment, memory hub 1105 may be a separate component within a chipset component or may be integrated within one or more processor(s) 1102. In at least one embodiment, memory hub 1105 couples with an I/O subsystem 1111 via a communication link 1106. In at least one embodiment, I/O subsystem 1111 includes an I/O hub 1107 that can enable computing system 1100 to receive input from one or more input device(s) 1108. In at least one embodiment, I/O hub 1107 can enable a display controller, which may be included in one or more processor(s) 1102, to provide outputs to one or more display device(s) 1110A. In at least one embodiment, one or more display device(s) 1110A coupled with I/O hub 1107 can include a local, internal, or embedded display device.

In at least one embodiment, processing subsystem 1101 includes one or more parallel processor(s) 1112 coupled to memory hub 1105 via a bus or other communication link 1113. In at least one embodiment, communication link 1113 may use one of any number of standards based communication link technologies or protocols, such as, but not limited to PCI Express, or may be a vendor-specific communications interface or communications fabric. In at least one embodiment, one or more parallel processor(s) 1112 form a computationally focused parallel or vector processing system that can include a large number of processing cores and/or processing clusters, such as a many-integrated core (MIC) processor. In at least one embodiment, some or all of parallel processor(s) 1112 form a graphics processing subsystem that can output pixels to one of one or more display device(s) 1110A coupled via I/O Hub 1107. In at least one embodiment, parallel processor(s) 1112 can also include a display controller and display interface (not shown) to enable a direct connection to one or more display device(s) 1110B.

In at least one embodiment, a system storage unit 1114 can connect to I/O hub 1107 to provide a storage mechanism for computing system 1100. In at least one embodiment, an I/O switch 1116 can be used to provide an interface mechanism to enable connections between I/O hub 1107 and other components, such as a network adapter 1118 and/or a wireless network adapter 1119 that may be integrated into platform, and various other devices that can be added via one or more add-in device(s) 1120. In at least one embodiment, network adapter 1118 can be an Ethernet adapter or another wired network adapter. In at least one embodiment, wireless network adapter 1119 can include one or more of a Wi-Fi, Bluetooth, near field communication (NFC), or other network device that includes one or more wireless radios.

In at least one embodiment, computing system 1100 can include other components not explicitly shown, including USB or other port connections, optical storage drives, video capture devices, and like, may also be connected to I/O hub 1107. In at least one embodiment, communication paths interconnecting various components in FIG. 11 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 1112 incorporate circuitry optimized for graphics and video processing, including, for example, video output circuitry, and constitutes a graphics processing unit (GPU). In at least one embodiment, parallel processor(s) 1112 incorporate circuitry optimized for general purpose processing. In at least one embodiment, components of computing system 1100 may be integrated with one or more other system elements on a single integrated circuit. For example, in at least one embodiment, parallel processor(s) 1112, memory hub 1105, processor(s) 1102, and I/O hub 1107 can be integrated into a system on chip (SoC) integrated circuit. In at least one embodiment, components of computing system 1100 can be integrated into a single package to form a system in package (SIP) configuration. In at least one embodiment, at least a portion of components of computing system 1100 can be integrated into a multi-chip module (MCM), which can be interconnected with other multi-chip modules into a modular computing system.

Processing logic 140 may be used to perform media stream processing operations associated with one or more embodiments. Details regarding processing logic 140 are provided herein in conjunction with FIG. 1. In at least one embodiment, processing logic 140 may be used in the system 1100 of FIG. 11 for performing media stream processing operations.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog or digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
processing a first media stream by a first processing engine of an application server, wherein the first processing engine is at least one of a hardware-implemented processing engine or a software-implemented processing engine;
determining an assignment of a second media stream to a second processing engine of the application server based at least on a performance state of the application server and one or more parameters of the second media stream, wherein the second processing engine is at least one of the hardware-implemented processing engine or the software-implemented processing engine; and
assigning the second media stream for processing by the second processing engine, wherein the first media stream and the second media stream are processed concurrently, and wherein the first processing engine is different than the second processing engine.

2. The method of claim 1, wherein the determining and assigning are performed responsive to at least one of: detecting an addition of a third media stream for processing, a removal of the first media stream or the second media stream from processing, or a change in one or more parameters of at least one of the first media stream or the second media stream.

3. The method of claim 1, further comprising:
determining the performance state of the application server; and
determining that the performance state satisfies one or more criteria prior to determining the assignment of the second media stream to the second processing engine of the application server.

4. The method of claim 1, wherein determining the assignment of the second media stream is further based on a set of performance capabilities of the application server.

5. The method of claim 4, wherein the set of performance capabilities of the application server comprises at least one of a set of supported hardware codecs or a set of supported hardware codec features of the application server.

6. The method of claim 1, wherein the performance state of the application server comprises at least one of a hardware encoder/decoder utilization, a processor utilization, a power utilization, or a system temperature of the application server.

7. The method of claim 1, wherein the one or more parameters of the second media stream comprise at least one of a resolution, a codec type, or a codec profile.

8. The method of claim 1, wherein assigning the second media stream comprises at least one of: switching from using the hardware-implemented processing engine to using the software-implemented processing engine to perform processing of the second media stream, or switching from using the software-implemented processing engine to using the hardware-implemented processing engine to perform processing of the second media stream.

9. The method of claim 1, wherein the performance state of the application server is based at least in part on processing of a plurality of media streams comprising the first media stream and the second media stream.

10. A system comprising:
a hardware-implemented processing engine configured to encode or decode a plurality of media streams;
a software-implemented processing engine configured to encode or decode the plurality of media streams; and
a processing device configured to perform operations comprising:
processing a first media stream of the plurality of media streams using a first processing engine, wherein the first processing engine is at least one of the hardware-implemented processing engine or the software-implemented processing engine;
detecting a media stream configuration event; and
responsive to detecting the media stream configuration event, dynamically switching from using the hardware-implemented processing engine to using the software-implemented processing engine to process a second media stream of the plurality of media streams, or from using the software-implemented processing engine to using the hardware-implemented processing engine to process the second media stream of the plurality of media streams, wherein the first media stream and the second media stream are processed concurrently.

11. The system of claim 10, wherein the media stream configuration event comprises at least one of: an addition of a third media stream for processing, a removal of the first media stream or the second media stream from processing, or a change in one or more parameters of at least one of the first media stream or the second media stream.

12. The system of claim 10, wherein dynamically switching processing of the second media stream of the plurality of media streams comprises:
determining an assignment of the second media stream to the hardware-implemented processing engine or the software-implemented processing engine based at least in part on a performance state of the system and one or more parameters of the second media stream; and
assigning the second media stream for processing by the hardware-implemented processing engine or the software-implemented processing engine based on the determined assignment.

13. The system of claim 12, wherein the processing device is configured to perform operations comprising:
determining the performance state of an application server; and
determining that the performance state satisfies one or more criteria prior to determining the assignment of the second media stream to the hardware-implemented processing engine or the software-implemented processing engine.

14. The system of claim 12, wherein determining the assignment of the second media stream is further based on a set of performance capabilities of an application server.

15. A method comprising:
processing a first media stream of a plurality of media streams using a first processing engine, wherein the first processing engine is at least one of a hardware-implemented processing engine of an application server or a software-implemented processing engine of the application server;
detecting a media stream configuration event; and responsive to detecting the media stream configuration event, dynamically switching processing of a second media stream of the plurality of media streams from the hardware-implemented processing engine to the software-implemented processing engine of the application server, or from the software-implemented processing engine to the hardware-implemented processing engine of the application server, wherein the first media stream and the second media stream are processed concurrently.

16. The method of claim 15, wherein the media stream configuration event comprises an addition of a third media stream for processing, a removal of the first media stream or the second media stream from processing, or a change in one or more parameters of at least one of the first media stream or the second media stream.

17. The method of claim 15, wherein dynamically switching processing of the second media stream of the plurality of media streams comprises:

determining an assignment of the second media stream to the hardware-implemented processing engine or the software-implemented processing engine of the application server based at least in part on a performance state of the application server and one or more parameters of the second media stream; and assigning the second media stream for processing by the hardware-implemented processing engine or the software-implemented processing engine of the application server based on the determined assignment.

18. The method of claim 17, further comprising:

determining the performance state of the application server; and determining that the performance state satisfies one or more criteria prior to determining the assignment of the second media stream to the hardware-implemented processing engine or the software-implemented processing engine.

19. The method of claim 17, wherein determining the assignment of the second media stream is further based on a set of performance capabilities of the application server.

20. The method of claim 18, wherein the performance state of the application server is based at least in part on processing of the plurality of media streams.

* * * * *